United States Patent
Teufel et al.

(10) Patent No.: US 9,290,116 B2
(45) Date of Patent: Mar. 22, 2016

(54) ACTUATOR AND HARDWARE SYSTEM FOR A VEHICLE SEAT

(75) Inventors: Ingo Teufel, Rockenhausen (DE); Joachim Kämmerer, Kaiserslautern (DE); Ralph Recktenwald, Freisen (DE)

(73) Assignee: KEIPER GMBH & CO. KG, Kaiserslautern (DE)

( * ) Notice: Subject to any disclaimer, the term of this patent is extended or adjusted under 35 U.S.C. 154(b) by 92 days.

(21) Appl. No.: 13/983,337

(22) PCT Filed: Feb. 3, 2012

(86) PCT No.: PCT/EP2012/000481
§ 371 (c)(1),
(2), (4) Date: Aug. 15, 2013

(87) PCT Pub. No.: WO2012/104093
PCT Pub. Date: Aug. 9, 2012

(65) Prior Publication Data
US 2013/0320736 A1 Dec. 5, 2013

(30) Foreign Application Priority Data

Feb. 3, 2011 (DE) .......................... 10 2011 010 700
Apr. 18, 2011 (DE) .......................... 10 2011 018 330

(51) Int. Cl.
*B60N 2/12* (2006.01)
*B60N 2/44* (2006.01)
*B60N 2/235* (2006.01)
(Continued)

(52) U.S. Cl.
CPC ................ *B60N 2/44* (2013.01); *B60N 2/0292* (2013.01); *B60N 2/12* (2013.01); *B60N 2/2356* (2013.01); *B60N 2/3013* (2013.01); *B60N 2/3065* (2013.01); *B60N 2/366* (2013.01); *B60N 2002/445* (2013.01); *G05G 1/015* (2013.01)

(58) Field of Classification Search
CPC ........................................................ B60N 2/366
See application file for complete search history.

(56) References Cited

U.S. PATENT DOCUMENTS 5,597,206 A * 1/1997 Ainsworth et al. ...... 297/378.12
5,664,839 A 9/1997 Pedronno
(Continued)

FOREIGN PATENT DOCUMENTS

DE 4444122 C1 4/1996
DE 20020753 U1 5/2002
(Continued)

OTHER PUBLICATIONS

International Search Report for PCT/EP2012/00481 mailed May 25, 2012.

*Primary Examiner* — David R Dunn
*Assistant Examiner* — Jody Giacoman
(74) *Attorney, Agent, or Firm* — The Dobrusin Law Firm, P.C.

(57) ABSTRACT

The invention relates to an actuator (71) for a vehicle seat, comprising a handle (41) for jointly actuating two locks (23), a force transfer between the handle and each lock, a first indicator (51) associated with the first force transfer, and a second indicator associated with the second force transfer, wherein the two indicators each indicate the respective locking status of the associated lock, and the two indicators actuate an overall indicator (61) by means of a logical OR function in order to visibly indicate the unlocked state. The force transfer is preferably formed from Bowden cables (43).

10 Claims, 15 Drawing Sheets

(51) Int. Cl.
   *B60N 2/36*    (2006.01)
   *B60N 2/02*    (2006.01)
   *B60N 2/30*    (2006.01)
   *G05G 1/015*   (2008.04)

(56) References Cited

U.S. PATENT DOCUMENTS

| | | | |
|---|---|---|---|
| 6,883,583 B2 | 4/2005 | Otto | |
| 7,134,703 B2 * | 11/2006 | Jeong | 296/65.03 |
| 7,198,330 B2 | 4/2007 | Wahlen et al. | |
| 7,201,437 B2 * | 4/2007 | Freijy | 297/61 |
| 7,571,963 B2 | 8/2009 | Peters et al. | |
| 7,575,281 B2 | 8/2009 | Jeong | |
| 7,677,667 B2 | 3/2010 | Peters et al. | |
| 2002/0033624 A1 * | 3/2002 | Konishi et al. | 297/336 |
| 2007/0057555 A1 * | 3/2007 | Woods et al. | 297/336 |
| 2008/0042481 A1 | 2/2008 | Ishikawa | |
| 2008/0084073 A1 * | 4/2008 | Willing et al. | 292/14 |
| 2010/0084903 A1 * | 4/2010 | Kammerer | 297/329 |

FOREIGN PATENT DOCUMENTS

| | | |
|---|---|---|
| DE | 10230637 A1 | 1/2004 |
| DE | 10163611 B4 | 8/2004 |
| DE | 10328504 B3 | 12/2004 |
| DE | 10332912 B3 | 3/2005 |
| DE | 10335869 A1 | 3/2005 |
| DE | 102005006565 A1 | 8/2006 |
| DE | 102005046807 B3 | 11/2006 |
| DE | 102006015560 B3 | 8/2007 |
| DE | 102006058232 A1 | 5/2008 |
| DE | 102005031918 B4 | 11/2008 |
| DE | 102008050468 B3 | 4/2010 |
| DE | 102009023386 A1 | 12/2010 |
| FR | 2720985 A1 | 6/1994 |

* cited by examiner

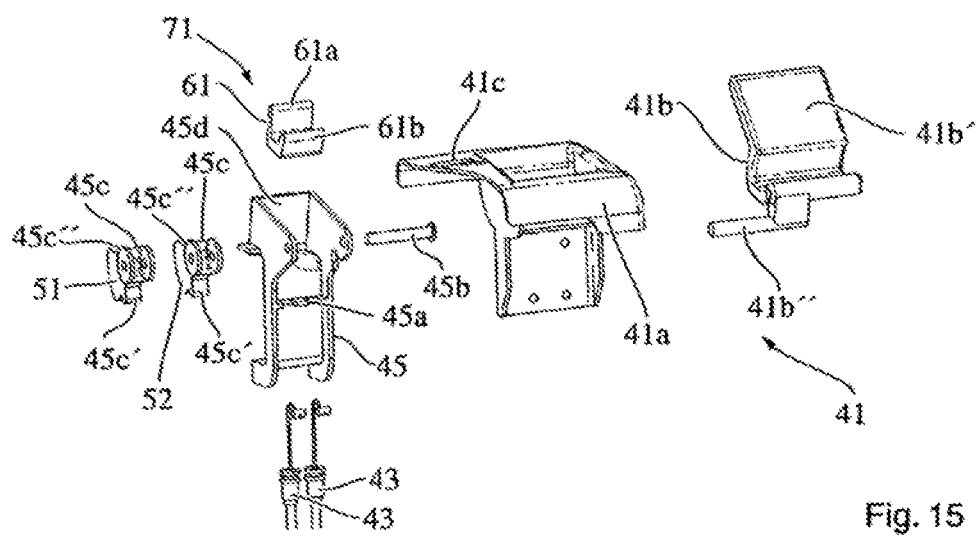
Fig. 15
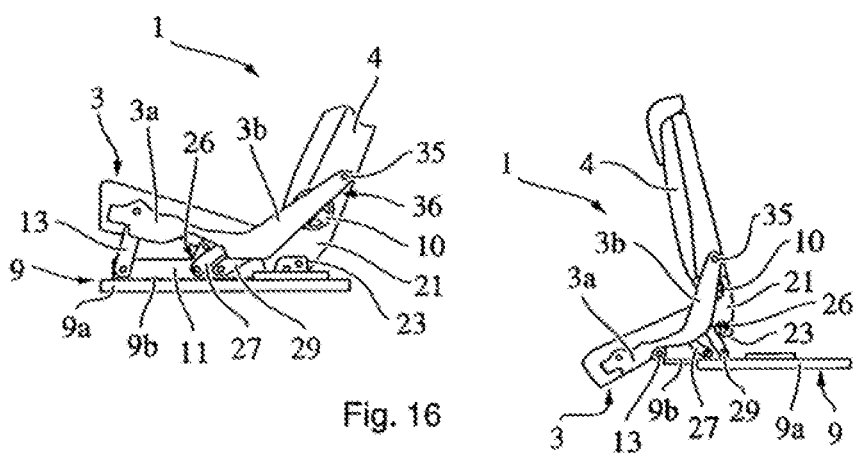
Fig. 16
Fig. 18
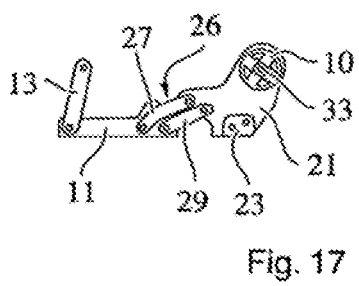
Fig. 17
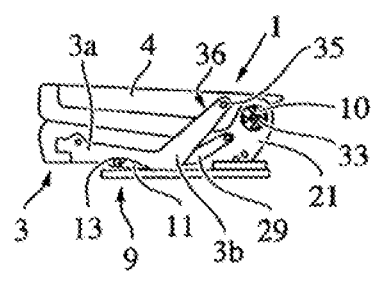
Fig. 19

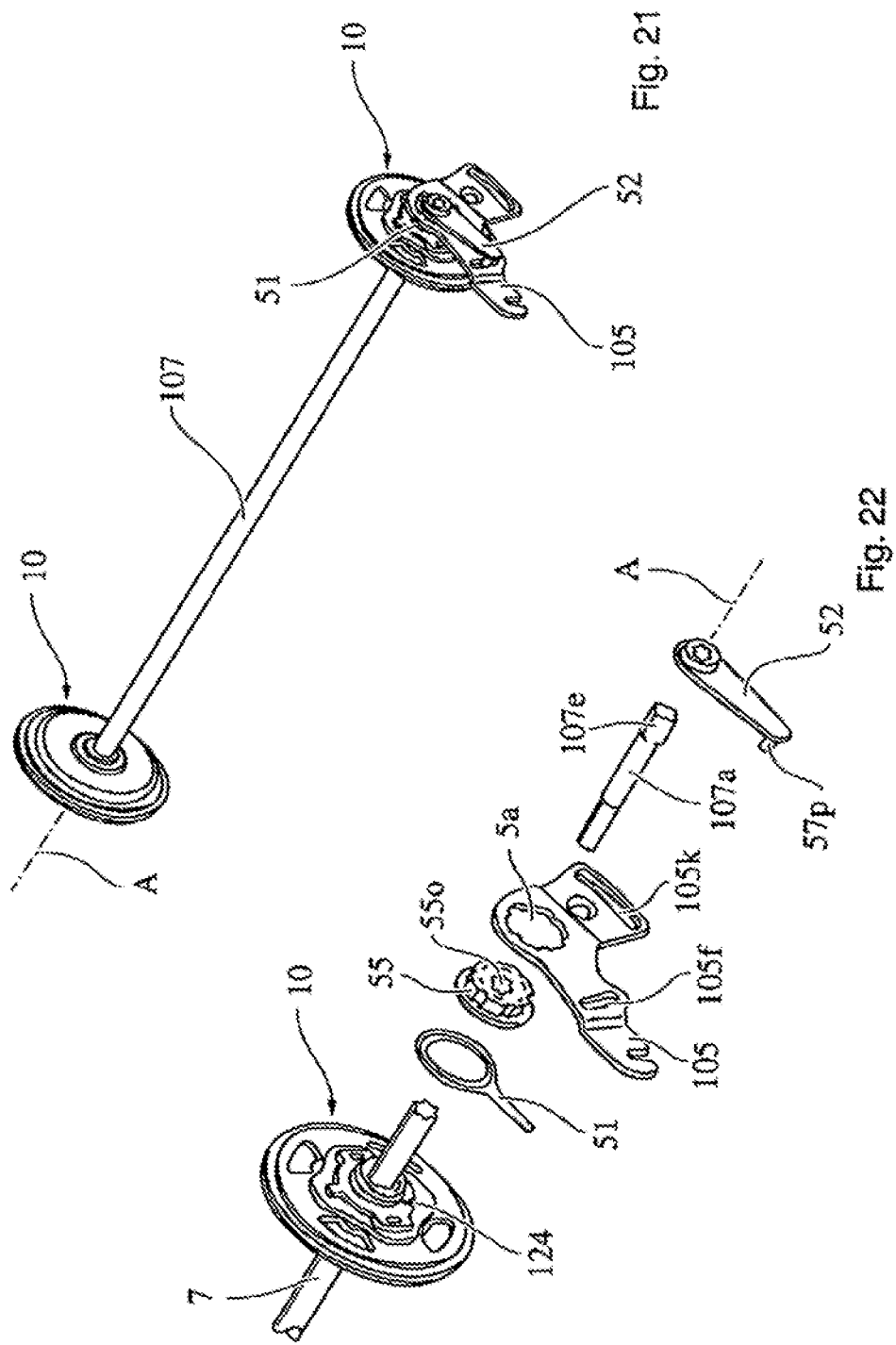

ACTUATOR AND HARDWARE SYSTEM FOR A VEHICLE SEAT

CLAIM OF PRIORITY

This application is a national phase filing under 35 USC §371 from PCT Application serial number PCT/EP2012/000481 filed on Feb. 3, 2012, and claims priority therefrom. This application further claims priority from DE102011010700.2, filed Feb. 3, 2011 and DE102011018330.2, filed Apr. 18, 2011, both incorporated herein by reference.

PRIOR ART

The invention relates to an actuation unit for a vehicle seat. The invention further relates to a fitting system for a vehicle.

A fitting system of this type having engaging fittings is known from DE10335369A1. In order to indicate the locking state of an engaging fitting, it is proposed in DE102005031918B4 to provide a hole in the fitting and in an operating lever which are aligned in the locked state.

STATEMENT OF INVENTION

An object of the invention is to improve an actuation unit for a vehicle seat having a looking display. This object is achieved according to the invention by an actuation unit for a vehicle seat having a handle for the common actuation of two locking systems, a force transmission between the handle and each locking system, a first indicator which is associated with the first force transmission, a second indicator which is associated with the second force transmission, wherein the two indicators each indicate the locking state of the associated locking system, and the two indicators control a general indicator with a logical OR function in order to display the unlocked state in a visible manner. The following relate to advantageous embodiments. The actuation unit, characterized in that the actuation element comprises a handle and/or in that the force transmission is formed by Bowden cables between the handle and the locking system at least in a partial region. The actuation unit, characterized in that the indicators are rotatable relative to an axis and are connected to cores of the Bowden cables. The actuation unit, characterized in that the two indicators or portions thereof are arranged spatially beside each other and both act on the general indicator. The actuation unit, characterized in that a force can be applied to the indicators from a first direction by the handle and an opposing force can be applied by the force transmission from a second direction different from the first direction. The actuation unit, characterized in that the general indicator cooperates with the indicators in a region in which the force transmission acts on the indicators. The actuation unit, characterized in that the indicators carry out a pivot movement and the general indicator carries out a linear movement. The actuation unit, characterized in that the indicators can be pivoted about the same pivot axis as an actuation lever of the handle. The actuation unit, characterized in that the handle has a single actuation arm which cooperates with the indicators. A vehicle seat which has a seat member and a backrest and which can be moved into a flat floor position and/or entry position, characterized by an actuation unit.

The logical association of the two indicators which are each associated with a fitting allows a general indicator to be arranged at a readily visible location, in particular in the upper region of the backrest at the outwardly directed (first) vehicle seat side, in the region of the operating lever in order to unlock the fitting system. The OR function of the "warning" display of the unlocked state (for example, lock unlocked at the first vehicle seat side and/or lock unlocked at the second vehicle seat side or rail locking system unlocked at the first vehicle seat side and/or rail locking system unlocked at the second vehicle seat side) is simultaneously an AND function for displaying the correctly locked state, that is to say, the inability of the general indicator to be seen indicates the locked state.

The power transmission preferably involves Bowden cables but other transmissions which involve relative displacements would also be possible. In particular, the indicators preferably cooperate with the cores of the Bowden cables but cooperation by the sheaths with the indicators is also possible.

The actuation unit according to the invention is used in vehicle seats preferably to display locking of the seat assembly after a pivoting release action, in particular in the case of rear seats. However, it can also be used at other locations and have other Bowden cable transmissions.

Another object of the invention is to improve a fitting system, of the type mentioned in the introduction. This object is achieved according to the invention by a fitting system having a fitting at a first vehicle seat side and at a second vehicle seat side, which fittings are locked in a locked state independently of each other, and having an operating lever whose actuation moves the two fittings from the locked state into the unlocked state, characterized in that a first indicator is associated with the fitting at the first vehicle seat side and a second indicator is associated with the fitting at the second vehicle seat side, wherein the two indicators each indicate the locking state of the associated fitting, and the two indicators control a general indicator with a logical OR function in order to display the unlocked state of at least one of the two fittings in a visible manner. The following relate to advantageous embodiments. The fitting system, characterized in that the indicators can be rotated relative to an axis and have radially protruding indicator members whose angular position indicates the locking state of the associated fitting. The fitting system, characterized in that the two indicators or portions thereof are arranged spatially beside each other and both act on the general indicator, in particular by means of a coupling spring. The fitting system, characterized in that the two fittings each have a first fitting member and a second fitting member which are locked with each other In the locked state of the filling, can be unlocked by a carrier being rotated and can be rotated relative to each other about an axis in the unlocked state of the fitting, and in that a transmission rod is arranged parallel with the axis between the two fittings at the two vehicle seat sides. The fitting system, characterized in that the first indicator is connected in a rotationally secure manner to the carrier of the fitting at the first vehicle seat side. The fitting system, characterized in that the transmission rod is connected in a rotationally secure manner to the carrier of the fitting at the second vehicle seat side. The fitting system, characterized in that the second indicator is connected in a rotationally secure manner to the transmission rod, in particular a transmission bolt thereof. The fitting system, characterized in that there is provided an adapter which is connected, on the one hand, with a clearance to one of the carriers for entrainment and, on the other hand, with a clearance to the transmission rod, in particular a transmission bolt thereof, for entrainment. The fitting system, characterized in that the operating lever is connected in a rotationally secure manner to the adapter or is constructed integrally. A vehicle seat having a seat member and a backrest which is fitted to the seat member by means of the fitting system, can be pivoted relative thereto and can be locked with different inclination adjustments.

The logical association of the two indicators which are each associated with a fitting allows a general indicator to be arranged at a readily visible location, in particular at the outwardly directed (first) vehicle seat side, at which the operating lever for the fitting system is also generally arranged. The OR function of the "warning" display of the unlocked state (fitting unlocked at the first vehicle seat side and/or fitting unlocked at the second vehicle seat side) is simultaneously an AND function for displaying the locked state, that is to say, the inability of the general indicator to be seen indicates the locked state of both fittings. If the fittings have mutually lockable fitting members which can be unlocked by a carrier being rotated, the locking state of the fittings is preferably read from the angular position of the carriers which are connected in a rotationally secure manner to an indicatory respectively. In order to transmit the angular position from the second vehicle seat side to the first vehicle seat side, the transmission rod which is used for unlocking at the same time is preferably used. An adapter which is connected with a clearance to the two carriers for entrainment and which is rotated by the operating lever is preferably provided. The clearance disconnects the two fittings during locking.

The fitting system according to the invention in particular has the actuation unit according to the invention, with the operating lever preferably acting directly or indirectly as a handle of the actuation unit.

The fitting system according to the invention is used in vehicle seats preferably to adjust the backrest inclination, in particular in the case of rear seats. However, it may also be used at other locations and have other fittings. In particular, the term "fitting" should be interpreted in this instance so broadly that it also includes other locking devices, for example, rotary latch type locks.

The invention is explained in greater detail below with reference to an embodiment illustrated in the drawings.

BRIEF DESCRIPTION OF THE DRAWINGS

In the drawings:

FIG. 15 is a second exploded view of the actuation unit, FIG. 16 is a partially sectioned side view of the vehicle seat in the position for use, FIG. 17 is a partial view of FIG. 16 without a base, seat cushion and backrest, FIG. 18 is a view corresponding to FIG. 16 in the entry position, FIG. 19 is a view corresponding to FIG. 16 in the flat floor position and FIG. 20 shows an actuation unit according to a development of the embodiment, Furthermore, in the drawings:

FIG. 21 is a perspective view of a fitting system according to the invention,

FIG. 22 is an exploded view of a portion of the fitting system,

EMBODIMENTS OF THE INVENTION

Figure 1:
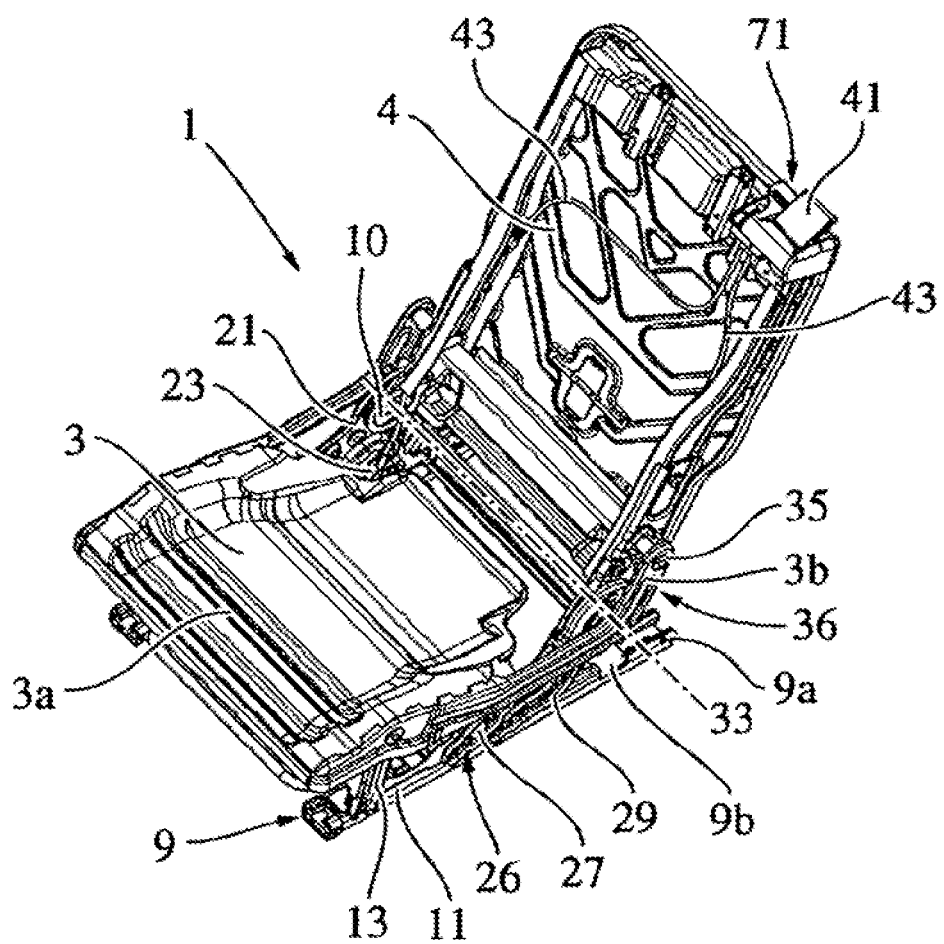
FIG. 1 is a perspective view of a vehicle seat.

An exemplary embodiment of the present invention is illustrated below with reference to FIGS. 1 to 20:

A vehicle seat 1 which is provided, for example, as an outer seat of a central or rear seat row of a motor vehicle, for example, a people carrier, has a seat cushion 3 and a backrest 4. In the following direction indications, it is assumed that the vehicle seat 1 is arranged in the motor vehicle in the direction of forward travel, the backrest 4 being located at the rear end of the seat cushion 3 in a position for use of the vehicle seat 1 suitable for conveying persons. The backrest 4 is adjustable in terms of its inclination by means of fittings 10 in the present instance so that a plurality of positions for use are defined. The term "seat cushion 3" is intended to be understood to be the entire subassembly comprising a structure, in this case a seat cushion carrier 3a and a covered pad. If components are articulated to the seat cushion 3, an articulation to the structure of the seat cushion 3 shall be understood thereby. This applies accordingly to the backrest 4. This structure of the vehicle seat 1 is disclosed in DE102008050468B3, whose disclosure content in this regard is expressly incorporated herein by reference.

For the sake of simplicity, only the left vehicle seat side of the substantially symmetrical vehicle seat 1 will be described below, that is to say, the components mentioned below are present two-fold unless otherwise described (optionally in a mirror-symmetrical manner). The vehicle seat 1 is first described in a special position for use, that is to say, the design position, in which the backrest 4 is inclined backwards relative to the vertical through, for example, 23°. A base 9 of the vehicle seat 1 is connected to the structure of the motor vehicle.

In the embodiment, the base 9 is in the form of a seat rail arrangement which affords the possibility of longitudinal adjustment of the vehicle seat 1 but may alternatively be in the form of a single component securely connected to the vehicle structure or be the vehicle structure itself. The various variants of the base 9 can also be combined to form a modular system. In the present case, the base 9 has a first seat rail 9a which is connected directly to the vehicle structure and a second seat rail 9b which is displaceable relative to the first seat rail in the longitudinal direction. The two seat rails 9a and 9b which are substantially profiled in a U-like manner engage one behind the other with their longitudinal edges which are bent inwards or outwards, respectively, and can be locked together by means of a rail locking system which is known per se.

A front foot 11 is fitted to the base 9, in this instance in a state connected securely to the second seat rail 9b. However, the front foot 11 could also be releasably locked with respect to the base 9. The seat cushion 3 is articulated to the front foot 11 by means of a crank 13, that crank 13 being provided at both ends with linkages, one of which forms the articulation with respect to the front foot 11 and the other of which forms the articulation with respect to the front end of the seat cushion 8.

Furthermore, a rear foot 21, which is constructed separately from the front foot 11 and which is releasably locked to the base 9 by means of a lock 23 which is fitted to the rear foot 21 and to which reference is also made as a locking system, is arranged on the base 9 behind the front foot 11 in the direction of travel, which rear foot 21 is locked, to be more precise, to a counter-element fixed to the base, for example, a bolt in the second seat rail 9b, and is therefore connected indirectly to the vehicle structure.

The rear foot 21 is further articulated to the front foot 11 by means of a rear foot four-bar linkage 26, wherein the four mechanism members of the rear foot four-bar linkage 26 comprise a first rod 27 and a second rod 29 which is arranged behind the first rod 27 in the direction of travel, which rods each have linkages at the two ends, respectively. Consequently, the rear foot 21 is connected to the base 9 by means of the rods 27 and 29. The rear foot four-bar linkage 26 is kept in a locked state in the positions for use by means of the lock 23. A first fitting member of the fitting 10 is also fitted to the rear foot 21 whilst a second fitting member of the fitting 10 which is pivotable about the backrest pivot axis 33 relative to the first fitting member and which can be locked thereto is fixed to the backrest 4. Consequently, the backrest 4 is adjustable in terms of its inclination relative to the rear foot 21 by means of the fitting 10. The backrest pivot axis 33 extends horizontally between the two vehicle seat sides and can be used as a transmission rod between the fittings 10 provided at both sides when the axis is in a physical construction.

The seat cushion 3 is articulated directly to the backrest 4 at both sides by means of exactly one linkage 35, To that end, the frame-like seat cushion carrier 3a, or more precisely the two lateral members thereof, is provided at the rear in the direction of travel with an arm 3b which is formed in this instance on the seat cushion carrier 3a and which protrudes obliquely upwards (and backwards). The linkage 35 is arranged at the end of the arm 3b. The linkage 35 is arranged so as to foe displaced relative to the backrest pivot axis 33 and has a pivot axis parallel with the backrest pivot axis 33. In the design position, the linkage 35 is located above and, in the travel direction, behind the backrest pivot axis 33, The two linkages of the crank 13, the fitting 10 having the backrest pivot axis 33 and the linkage 35 form another four-bar linkage, referred to below as the cushion four-bar linkage 36, In the positions for use, that cushion four-bar linkage 36 is kept in the locked state by the fitting 10.

During the adjustment of the inclination of the backrest 4, the fitting 10 is unlocked at each vehicle seat side, the backrest 4 is pivoted about the backrest pivot axis 33 into the desired position, with the cushion four-bar linkage 36 also moving, and then each fitting 10 is locked again. The movement of the cushion four-bar linkage 36 also changes the inclination of the seat cushion 3 slightly. The backrest 4 can also be pivoted backwards into a flat state so that the vehicle seat 1 takes up a reclined position.

In order to move the vehicle seat 1 into an entry position as an outstanding non-use position, the lock. 23 is unlocked. To that end, a handle 41 which is positioned at the outer, upper side of the backrest 4 is actuated by the user, as will be described in greater detail below. By the handle 41 being actuated, a force transmission via two Bowden cables 43 is brought about to the two locks 23 which are thereby unlocked. The rear foot 22 is now displaced forwards by means of the rear foot four-bar linkage 26, that is to say, the rods 27 and 29, that is to say, the rear foot 21 is moved upwards and forwards relative to the base 9 by the superimposition of a plurality of pivot movements, whereby it moves away from the base 9. The fitting 10 remains locked. The backrest 4 is thereby in a rigid arrangement relative to the rear foot 21, but pivots forwards overall. The crank 13 which pivots forwards lowers the front end of the seat cushion 3 whilst the displacement movement of the rear foot 21 raises the rear end of the seat cushion 3.

When the entry position is reached, in which the access to a rear row of seats is easier, the lock 23 or another locking device may optionally be looked with the front foot 11, that is to say, the rear foot 21 and the front foot 11 are preferably locked together. The return movement into the previously assumed position for use is brought about after release of the said locking system between the feet 11 and 21 in the reverse sequence of the steps described.

A replacement pivot location for the rear foot four-bar linkage 26 can be defined by a comparison between the position for use and the entry position, that is to say, the rear foot 21 would foe articulated at that replacement pivot location to the base 9 or vehicle structure if a pivot movement of the vehicle seat 1 about that replacement pivot location had the same start and end position. In the solution according to the invention, however, the replacement pivot location is clearly below the base 9 and therefore cannot be produced. With a direct articulation of the rear foot 21 to the base 9, the desired entry dimension (that is to say, the dimension of the accessible space behind the vehicle seat 1) could not be achieved. Consequently, a better use of the pivot angle range in the case of relatively short pivot arms is brought about with the rear foot four-bar linkage 26, Optionally, the locking system of the seat rails 9a and 9b is unlocked during the transition from the position for use to the entry position so that the second seat rail 9b can be displaced forwards, which increases the space behind the vehicle seat 1, that is to say, the entry dimension, and further makes access easier. A force-controlled unlocking system of the seat rails 9a and 9b is preferable, for example, in that one of the rods 27 and 29 actuates the unlocking system during pivoting, as is disclosed, for example, in DE10 2007 36 450 B3. Alternatively, another sequence is also possible.

In order to change the vehicle seat 1 into a flat floor position as another outstanding non-use position in which an increased storage space is available, the backrest 4 is folded forwards after the fitting 10 is unlocked. The cushion four-bar linkage 36 moves as in the case of the adjustment of inclination. By the crank 13 being moved forwards, the cushion four-bar linkage 36 and therefore the seat cushion 3 begins to be lowered. The backrest 4 is placed on the seat cushion 3 as the flat floor position, in which the rear of the backrest 4 is at least approximately in the horizontal position, is approached. That folded-together flat floor position is secured by the fitting 10 being locked. The return movement into the previously assumed position for use is carried out after the fitting 10 is unlocked in the reverse sequence of the steps described.

To the extent described above, the structure substantially corresponds to DE 10 2008 050 468 B3. As already described above, in order to move the vehicle seat 1 into an entry position the handle 41 by means of which actuation of the two locks 23 is carried out for the purpose of unlocking thereof is provided as an unlocking actuation device, with a Bowden cable 43 being provided as the force-transmitting element between the unlocking actuation device and each or the two locks 23.

The handle 41 is constructed in several portions, wherein it has a holder 41a fixed to the backrest, an actuation lever 41b which can be pivoted in the holder 41a about a rigid pivot axis and which has a handle region 41b' and an actuation arm 41b" which is integrally connected thereto, and a slot-like indicator opening 41c directly adjacent to the actuation lever 41b.

A Bowden cable holder 45 is arranged adjacent to the holder 41a. The Bowden cable holder 45 has two sheath supports 45a for the sheaths of the Bowden cables 43, a rigid axle 45b which is held by two openings of the Bowden cable holder 45 and two core end holders 45c which can be pivoted about the axle 45b.

The pivotable core end holders 45c each have a circle-portion-like region with a cam 45c' which projects at one end and which cooperates with the actuation arm 41b" of the handle 41, and a contact region 45c" which is arranged at the other end region of the circle-portion-like region and which is formed by the end region at this side of the outer covering face of the circle-portion-like region and a curved transition region in which the outer covering face merges into a region which extends substantially in a radial direction. The entire circle-portion-like region of the first core end holder 45 with the cam 45c' and contact region 45c" which is associated with the first Bowden cable 43 forms a first indicator 51 in this instance. The entire circle-portion-like region of the second core end holder 45 with the earn 45c' and contact region 45c" which is associated with the second Bowden cable 43 forms a second indicator 52 in this instance. Those two indicators 51 and 52 cooperate via the contact regions 45c" thereof with a general indicator 61 which is positioned in the Bowden cable holder 45 and of which a display aria 61a is positioned in the region of the slot-like indicator opening 41c of the handle 41 and can project beyond it.

The general indicator 61 is in this instance in a form which is formed in this instance substantially by two adjacent planar faces (outer face of the display arm 61a and of a connection region between the display arm 61a and actuation arm 61b) which are arranged at an angle of approximately 90° relative to each other, and a face (outer face of the actuation arm 61b) which is curved at an angle greater than 90° and at least partially at a radius. The outer faces of the display arm 61a and the actuation arm 61b are arranged in the manner of a truncated wedge, that is to say, in the form of a wedge whose tip is missing. The display arm 61a abuts a guide face 45d of the Bowden cable holder 45 in a planar manner with, the outer face thereof so as to be able to be displaced upwards and downwards. The actuation arm 61b positioned at the other side cooperates with the two indicators 51, 52 in the contact region 45c" by means of the outer face thereof. In this instance, the outer face of the actuation arm 61b is formed in accordance with the curvature of the outer faces of the indicators 51, 52 and have such dimensions that, when the indicators 51, 52 are raised to a maximum extent, the curvature of the actuation arm 61b is concentric with respect to the pivot axis of the indicators 51, 52.

Owing to the construction of the general indicator 61 with an at least partially curved outer face of the actuation arm 61b, the indicators 51, 52 can-individually or together- further pivot in the event of actuation of the corresponding Bowden cable 45 from the position in which the general indicator 61 is extended to a maximum extent, without the general indicator 61 being further moved.

The general indicator 61 is pressed, on the one hand, downward counter to the extension direction by means of springs which are not illustrated in the drawings. Furthermore, springs pretension the indicators 51, 52 in such a manner that they press the general indicator 61 in the extension direction; the return of the indicators 51, 52 is brought about by means of the Bowden cables 43. The spring constants are configured to be of such a magnitude that secure extension of the general, indicator 61 is ensured, that, is to say, the resilient force of the spring pressing the general indicator 61 downwards in the retraction direction is smaller than the force of each of the springs which redirect the indicators 51, 52 in order to move the general indicator 61 in the extension direction. As a result of the said curved outer face of the activation arm 61b of the general indicator 61 in conjunction with the correspondingly curved outer face of the indicators 51, 52 in the contact region 45c", it is ensured that the movement of the general indicator 61 is limited.

The function of the handle 41 in conjunction with the general indicator 61 is explained in greater detail below.

Figures 2, 3:
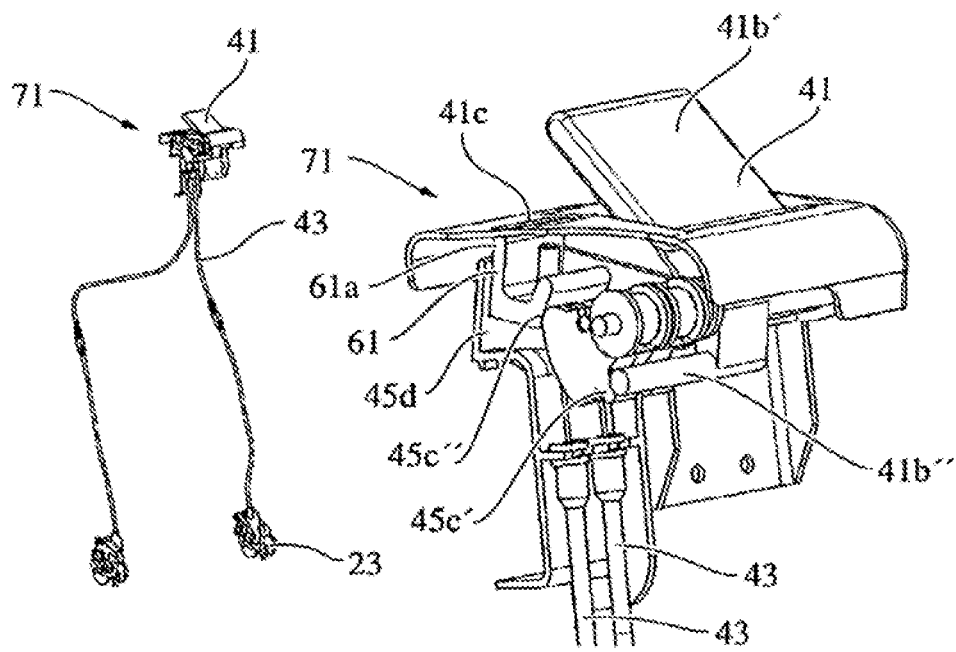
FIG. 2 is a partial view of the locking actuation device in the locked position.
FIG. 3 is a detailed view of the actuation unit according to the invention according to FIG. 2.

In the locked initial position illustrated in Figures 2 and 3, the two looks 23 are locked with the corresponding rear feet 21. The gripping region 41b' of the handle 41 is slightly raised in order to allow the gripping region 41b' to be readily gripped. The actuation arm 41b" of the handle 41 is in abutment with both indicators 51, 52 in the region of the cams 45c'. At the other side of the indicators 51, 52, the curved transition region of the contact region 45c" abuts the general indicator 61, with the general indicator 61, which is pressed down by the spring which is associated therewith and which is not illustrated, being arranged in the lowest position thereof so that the display arm 61a terminates in the slot-like indicator opening 41c, as illustrated in FIG. 3.

Figure 4:
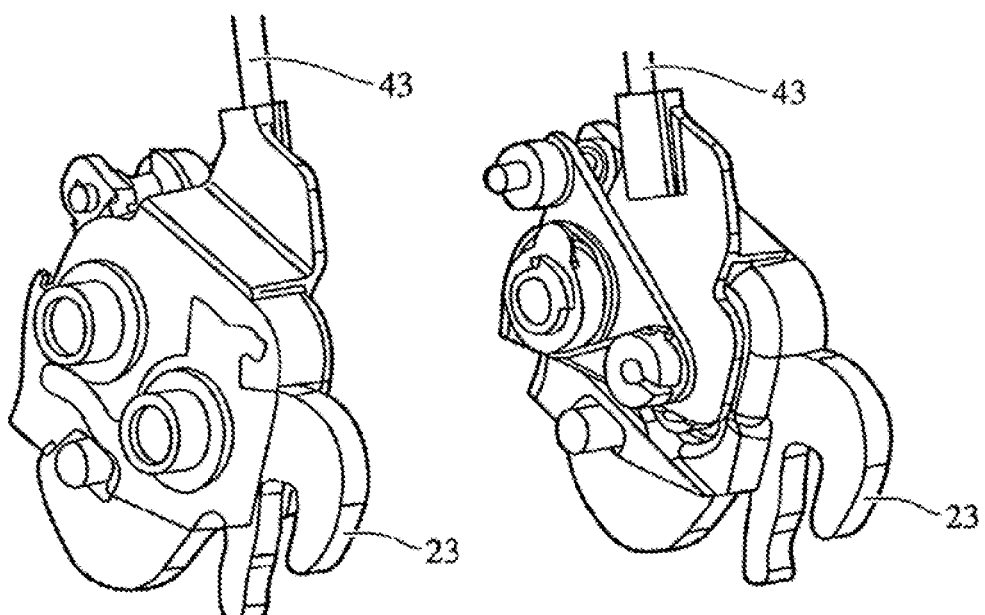
FIG. 4 is another detailed view of the locking systems according to FIG. 2.
Figures 5, 6:
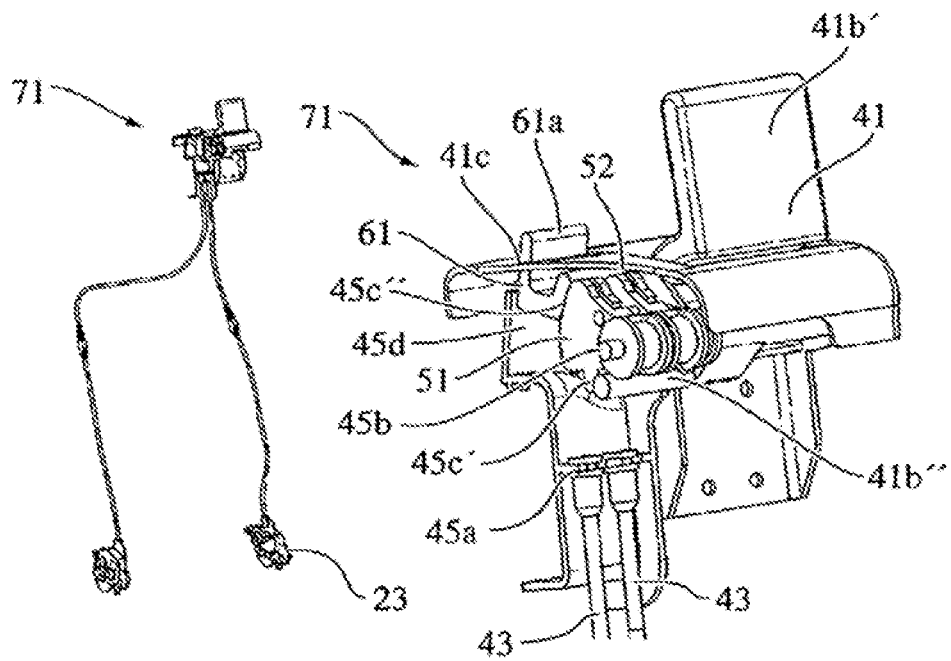
FIG. 5 is a partial view of the locking actuation device in the completely unlocked position.
FIG. 6 is a detailed view of the actuation unit according to FIG. 5.

If the actuation lever 41 is actuated, as illustrated in FIGS. 4 and 4, the two Bowden cables 43 are actuated until the two locks 23 are in the completely unlocked position and release the corresponding rear foot 21. By the actuation lever 41b of the handle 41 being pulled, a pivot movement of the gripping region 41b' with the actuation arm 41b" is brought about. In this instance, the actuation arm 41b" which adjoins the cams 45c' of the core end holders 45c carries them with it so that the core end holders 45c also carry out a pivot movement, with the pivot movement of the actuation lever 41b and the pivot movement of the core end holders 45c taking place at least substantially about the same pivot axis. The core end holders 45c carry the core ends so that the core ends move relative to the sheaths held by the sheath supports 45a, whereby a force transmission is brought about with respect to the looks 23 so that the locks become unlocked. At the same time, the core end holders 45c carry, in the course of their function as indicators 51, 52, the general indicator 61 counter to the resilient force which presses it down, which general indicator is pushed upwards along the guide face 45d so that the display arm 61a projects upwards through the indicator opening 41c and becomes visible to the operator (see FIG. 6). During the displacement movement of the general indicator 61, the abutment location within the contact region 45c'' changes in the direction of the outer covering face of the circle-portion-like region. As soon as at least one of the indicators 51, 52 has pushed the general indicator 61 and has therefore extended so far upwards that the curved outer face of the actuation arm 61b is arranged concentrically relative to the pivot anis of the indicators 52, 52, the extension movement of the general indicator 61 is terminated. That is to say, the general indicator 61 does not extend any further even if the indicators 51, 52 are rotated further.

Figures 7, 8:
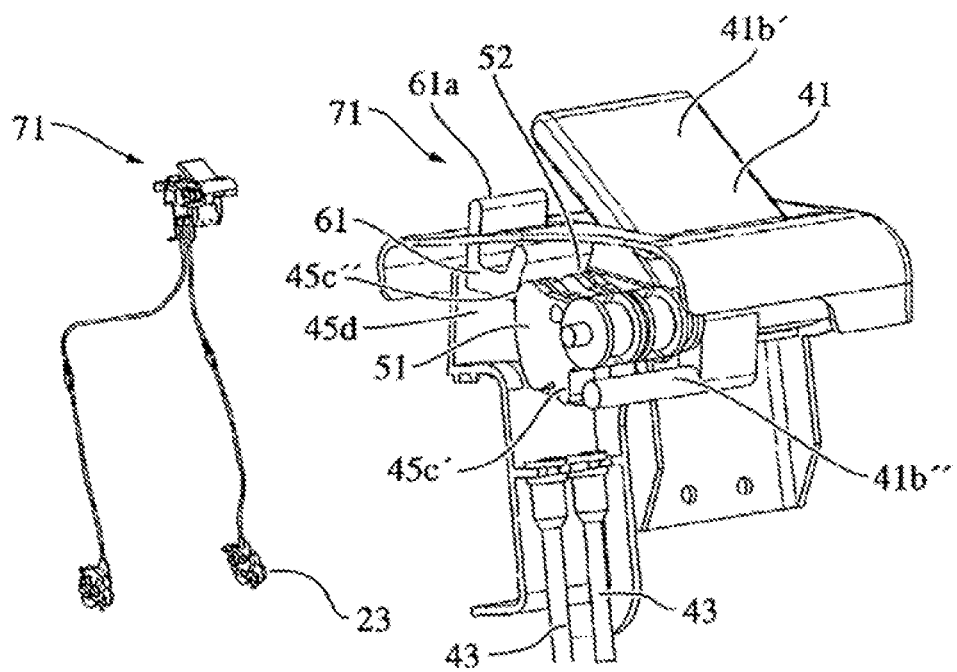
FIG. 7 is a partial view of the locking actuation device in the completely unlocked position during the forward folding action into the flat floor position.
FIG. 8 is a detailed view of the actuation unit according to FIG. 7.
Figures 9, 10:
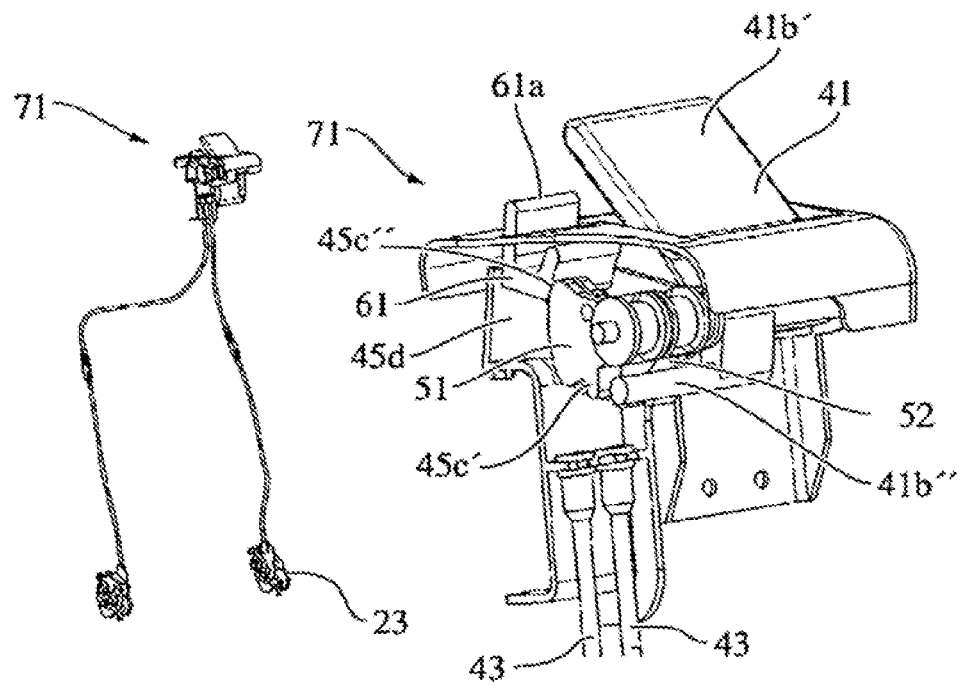
FIG. 9 is a partial view of the locking actuation device with an incorrectly locked lock at one side.
FIG. 10 is a detailed view of the actuation unit according to FIG. 9.
Figures 11, 12:
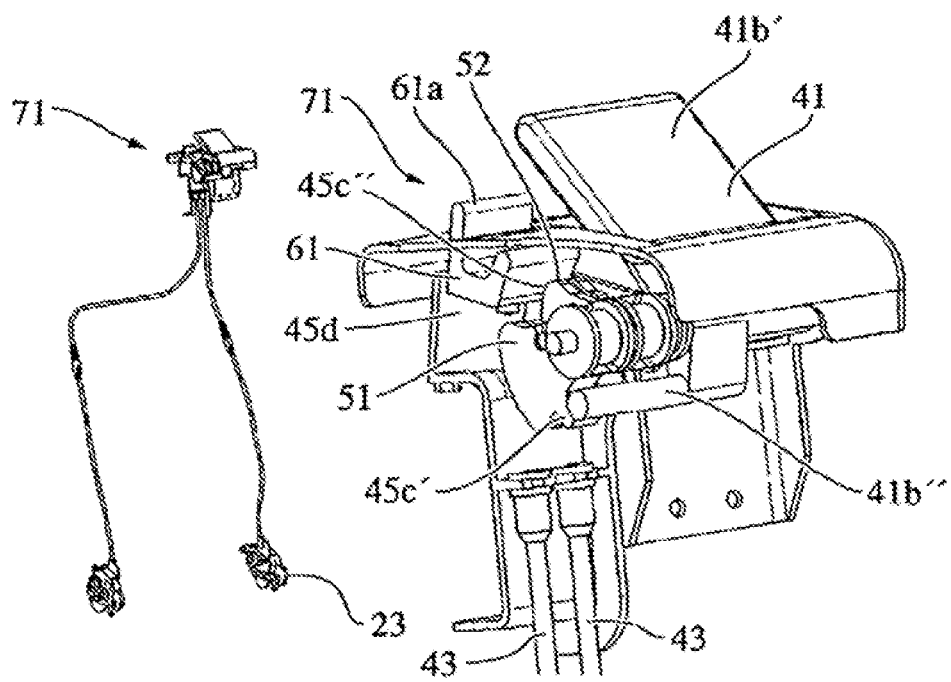
FIG. 11 is a partial view of the locking actuation device with an incorrectly locked lock at the other side.
FIG. 12 is a detailed view of the actuation unit according to FIG. 11.
Figure 13:
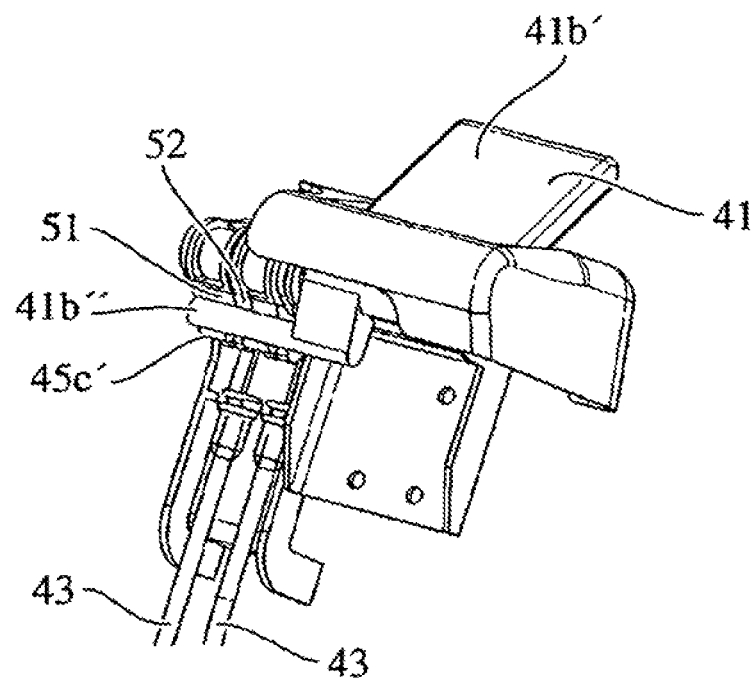
FIG. 13 is a detailed view of the actuation unit from a different perspective.
Figure 14:
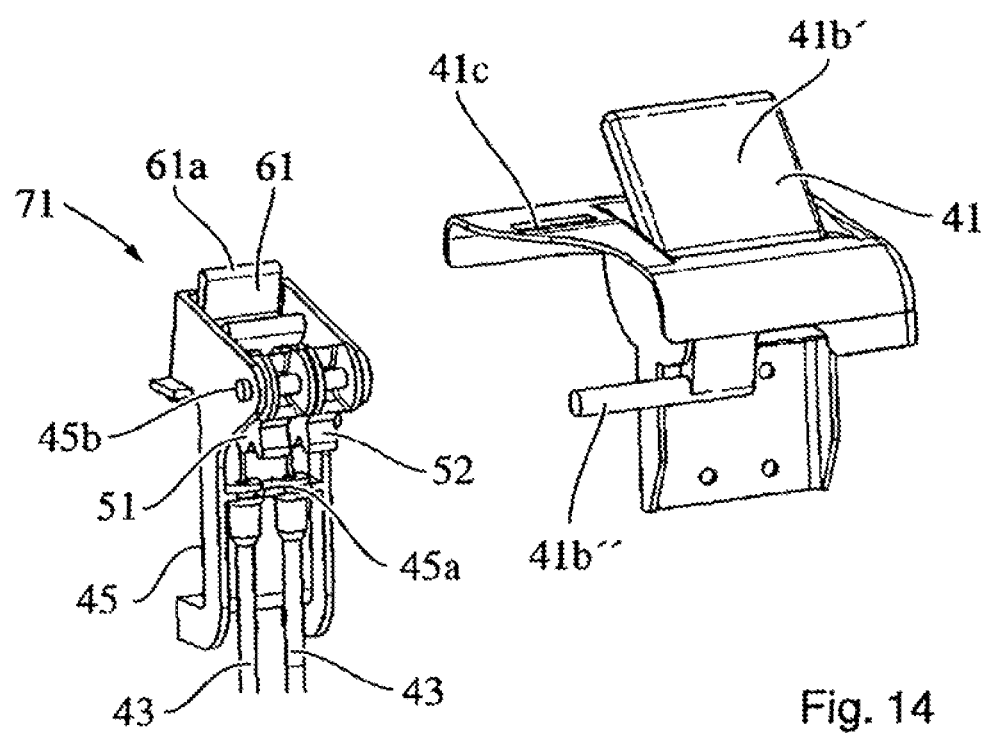
FIG. 14 is a first exploded view of the actuation unit.

During the folding of the vehicle seat 1 forwards with the backrest 4 into the entry position, which is illustrated in FIGS. 10 and 8, the lochs 23 remain in their unlocked position, that is to say, the general indicator 61 also indicates that unlocked state in that the display arm 61a projects further through the indicator opening 41c. This is ensured in that, although the actuation lever 41b returns to the initial position with the actuation arm 41b'' as a result of the resilient force of a restoring spring (not illustrated in the Figures), the Bowden cables still have a given relative displacement between the core end and the sheath in relation to the initial state, so that the indicators 51, 52 only move backward slightly and in particular have not yet come into abutment with the actuation arm 41b'' again. They are still thereby in abutment with the contact region 45c' against the general indicator 61 and hold it in the extended position.

If problems occur when the locks 23 are being locked, as illustrated in FIGS. 9 to 12, the relative displacement of the core and sheath is not completely reset in the case of the Bowden cable 43 associated with the corresponding lock 23 so that the corresponding indicator 51 (cf. FIGS. 9, 10) and 52 (cf. FIGS. 11, 12), respectively, also does not move back. That indicator 51 or 52 holds the general indicator 61—counter to the force of the spring which is associated with the general indicator 61 and which is not illustrated—in an extended position because, in the event of incomplete locking of one of the locks 23, the corresponding indicator 51 or 52, respectively, does not move into abutment again with the actuation arm 41b'' but instead remains in a position pivoted relative to the initial position, so that the user can readily identify the malfunction.

Therefore, the general indicator 61 forms, a locking display for the vehicle seat 1 in conjunction with the two indicators 51 and 52. In general, an actuation unit 71 for a vehicle seat according to the embodiment is formed by the handle 41 for common actuation of the two locks 23, the force transmission between the handle 41 and each of the two locks 23, the two indicators 51, 52 and the general indicator 61, Although a general indicator which cooperates with two indicators is described above, the general indicator may naturally also cooperate with three and more indicators, wherein it indicates a malfunction as soon as only a single one of the indicators indicates a malfunction. For example, an interrogation in respect of a seat rail locking system and/or fitting locking system can foe carried out in conjunction with the interrogation in respect of the lock locking systems.

Furthermore, in place of the above-described locks 23 for locking the rear feet 21 by the Bowden cables 43, any other locking systems can also be unlocked, such as, for example, the seat rail locking system in the context of a longitudinal displacement in order to take up an entry position (Easy Entry position) so that the actuation unit 71 in this instance indicates a released seat rail locking system, in particular a malfunction of the seat rail locking system.

Figure 20:
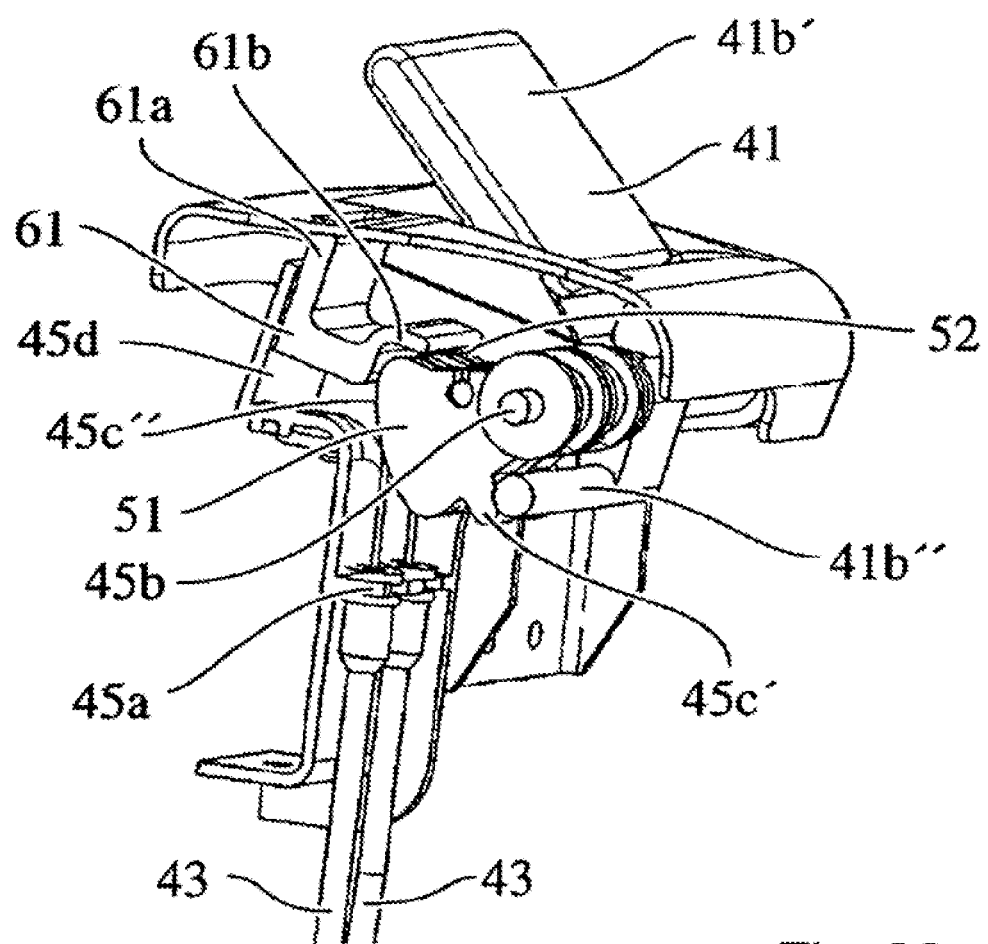
Figure 24:
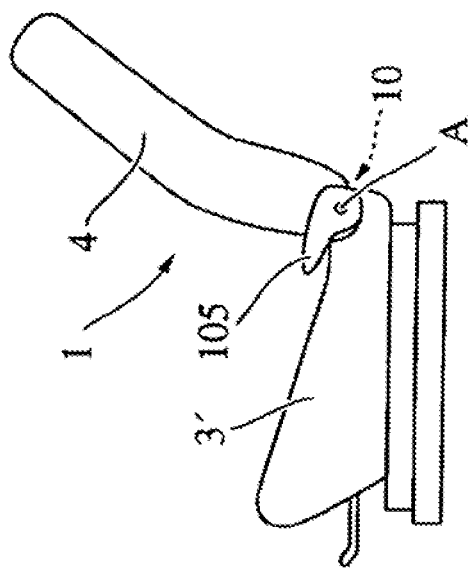
FIG. 24 is a schematic view of a vehicle seat.
Figure 23:
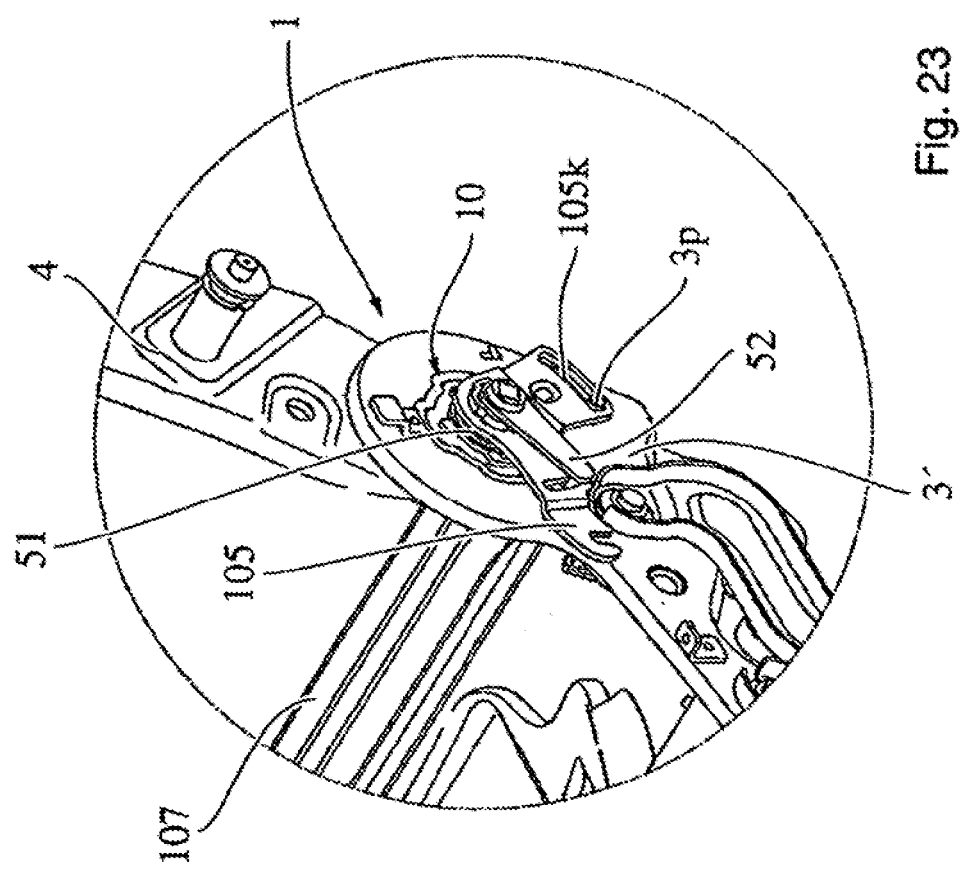
FIG. 23 is a partial view of a vehicle seat.
Figure 26:
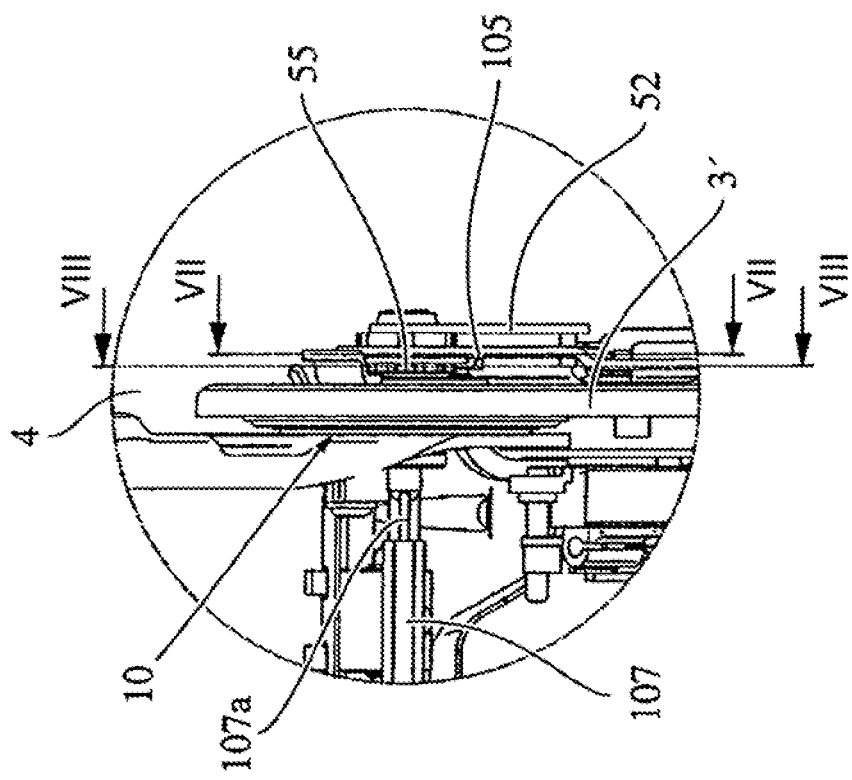
FIG. 26 is a partial radial view of the fitting system at the first vehicle seat side.
Figure 25:
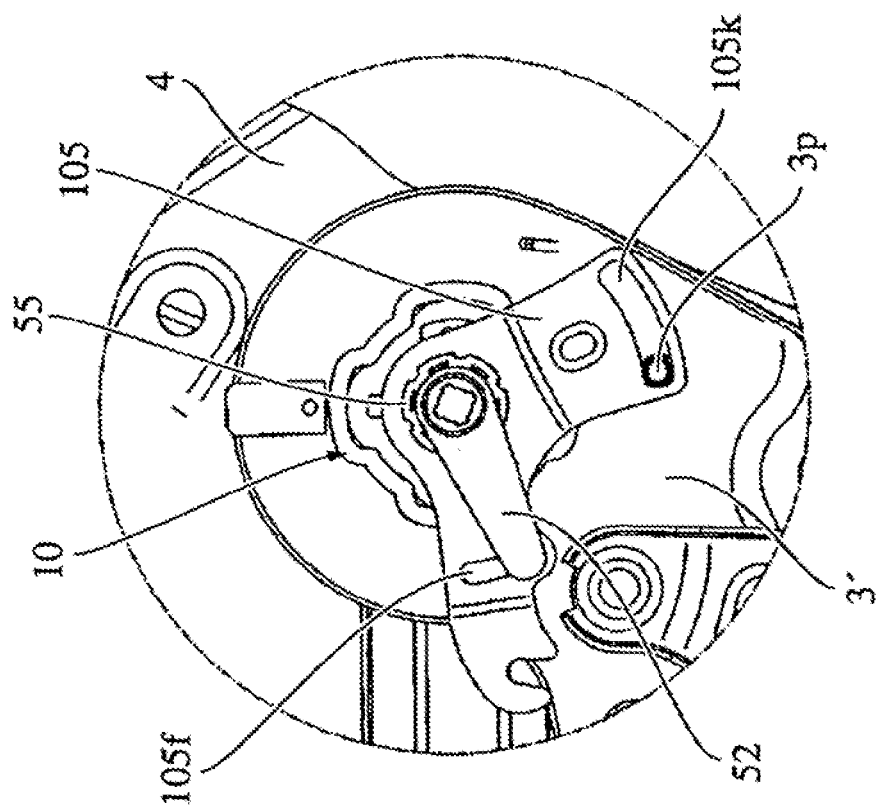
FIG. 25 is a partial axial view of the fitting system at the first vehicle seat side.
Figure 28:
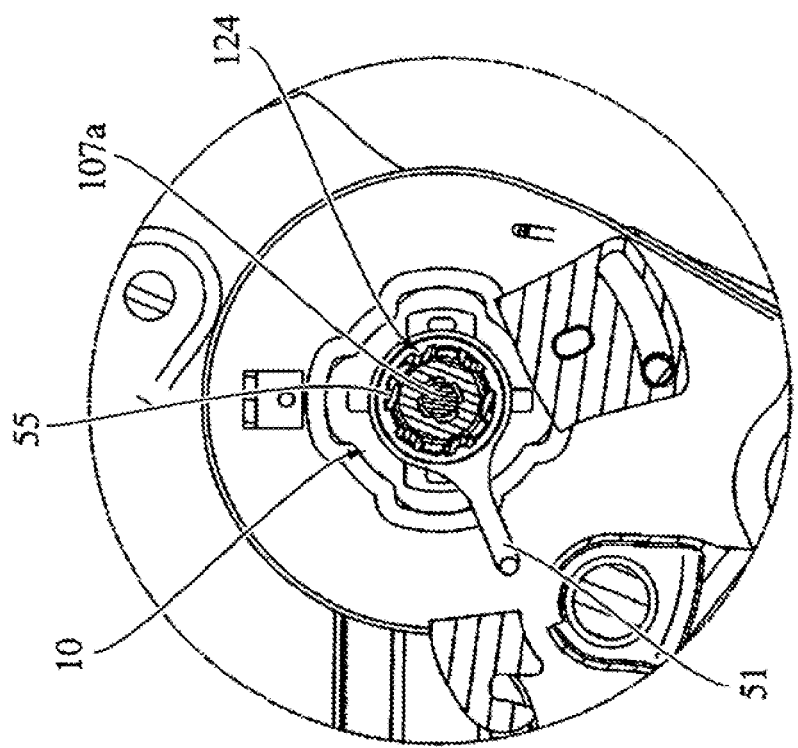
FIG. 28 is a section along the line VIII-VIII in FIG. 26.
Figure 27:
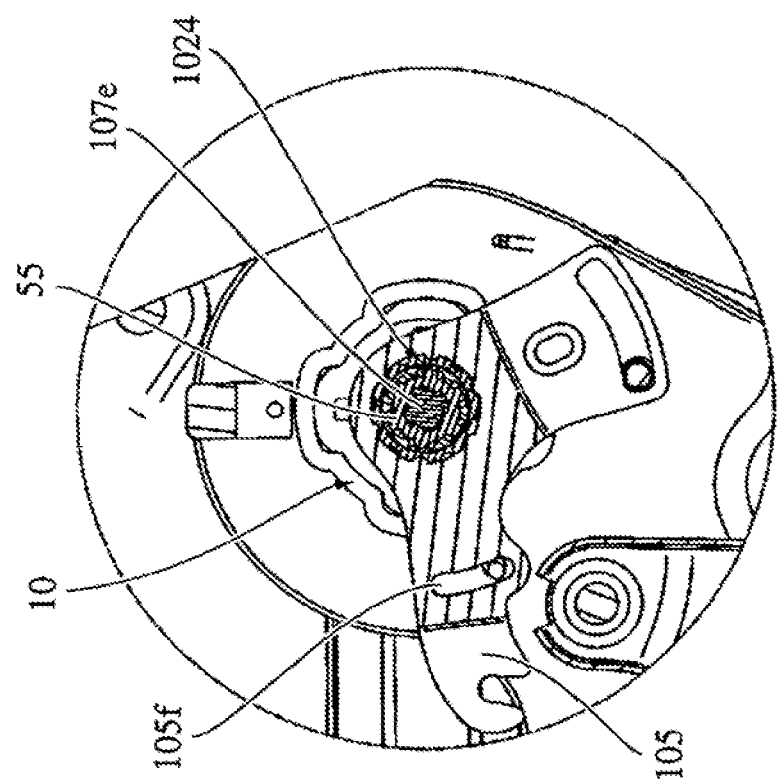
FIG. 27 is a section along the line VII-VII in FIG. 26.
Figure 30:
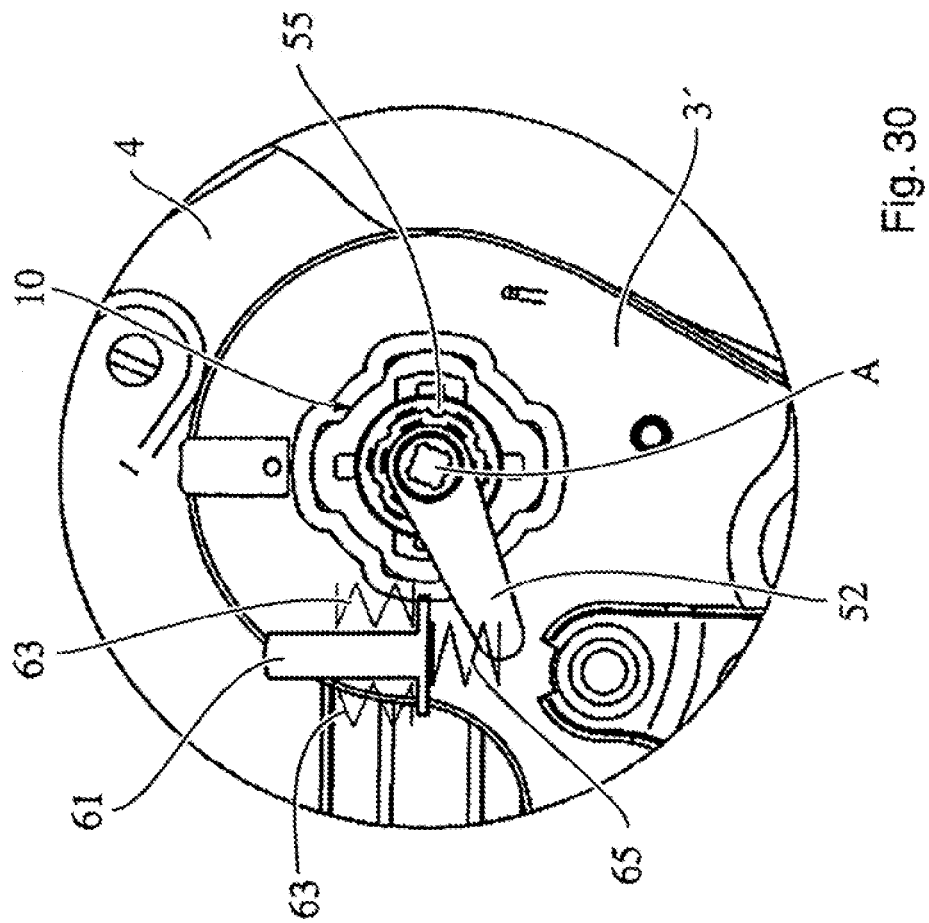
FIG. 30 is a section through a portion of the fitting system at the first vehicle seat side with the fittings-locked.
Figure 29:
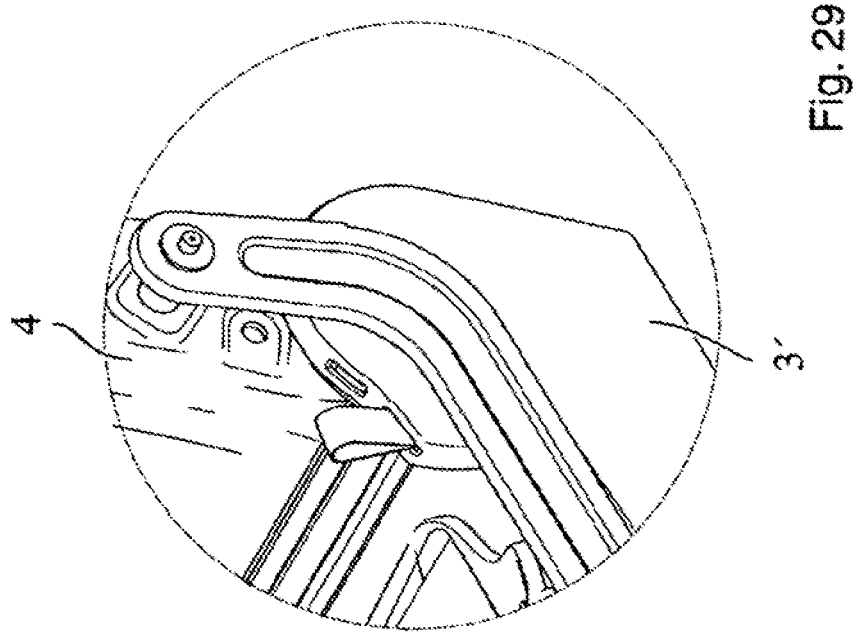
FIG. 29 is a partial perspective view of the fitting system at the first vehicle seat side with the fittings locked.
Figure 32:
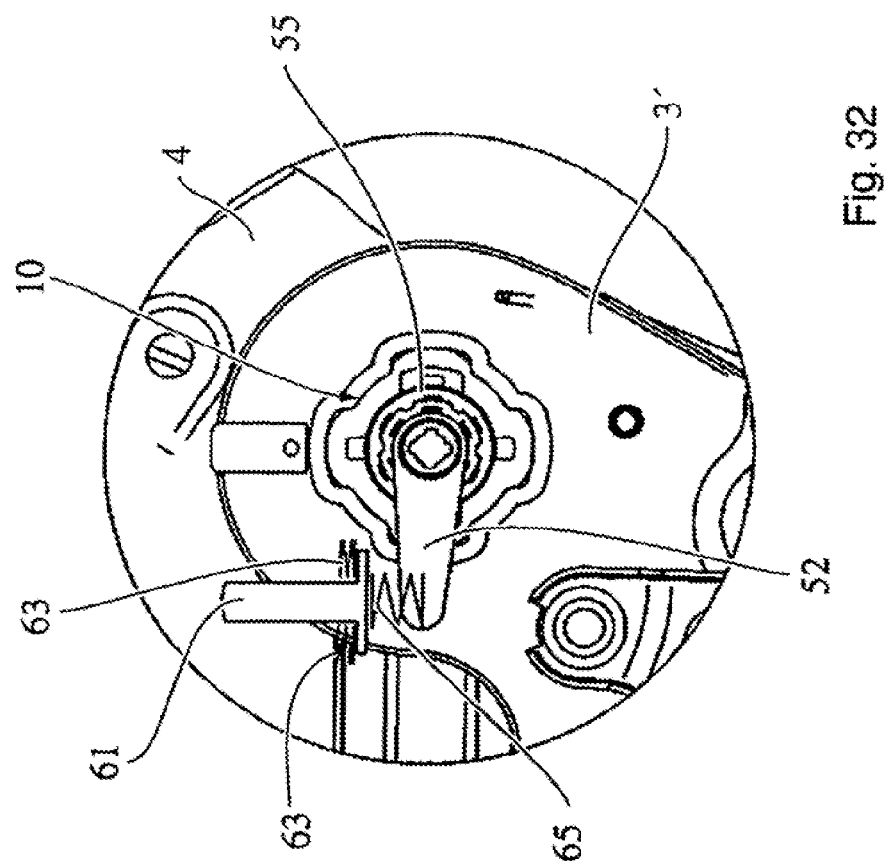
FIG. 32 is a section corresponding to FIG. 30 with two unlocked fittings.
Figure 31:
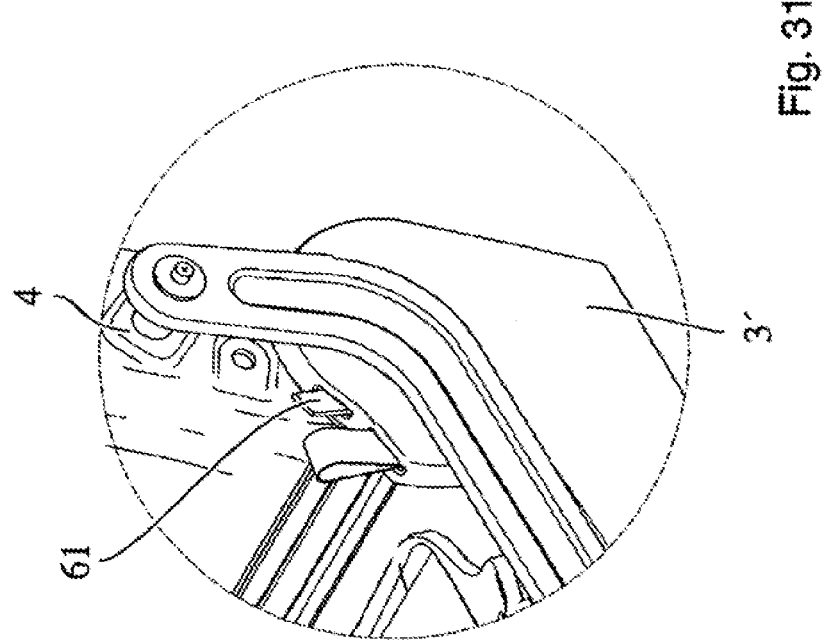
FIG. 31 is a partial view corresponding to FIG. 29 with at least one unlocked fitting.
Figure 33:
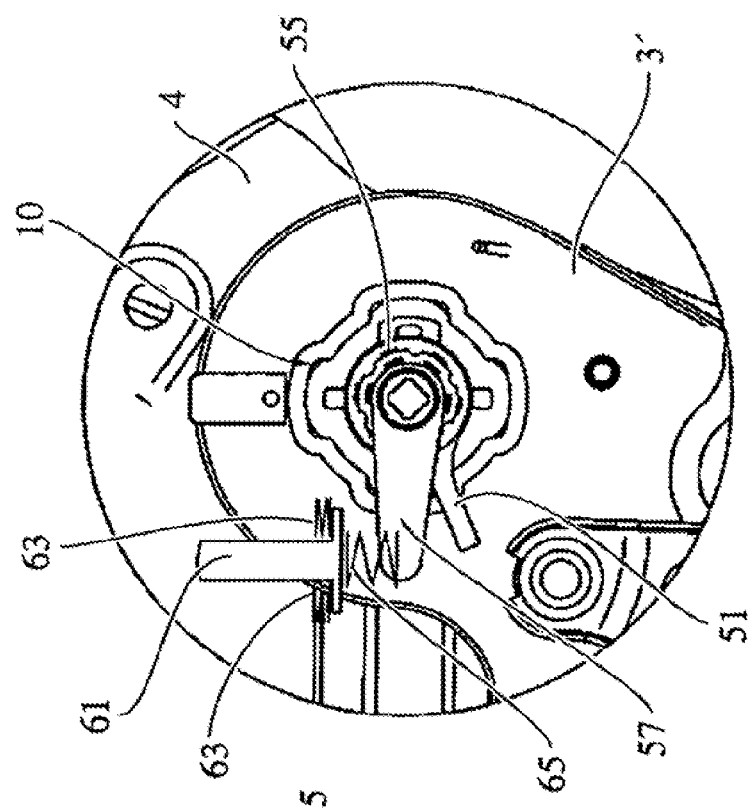
FIG. 33 is a section corresponding to FIG. 30 with an unlocked fitting at the first vehicle seat side.
Figure 34:
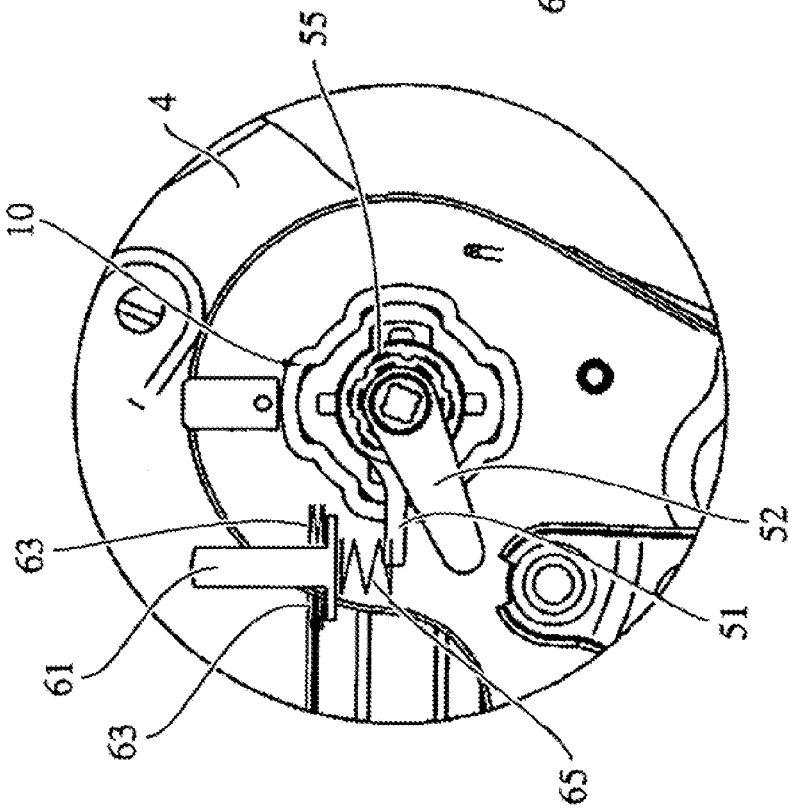
FIG. 34 is a section corresponding to FIG. 30 with an unlocked fitting at the second vehicle seat side.
Figures 35, 36:
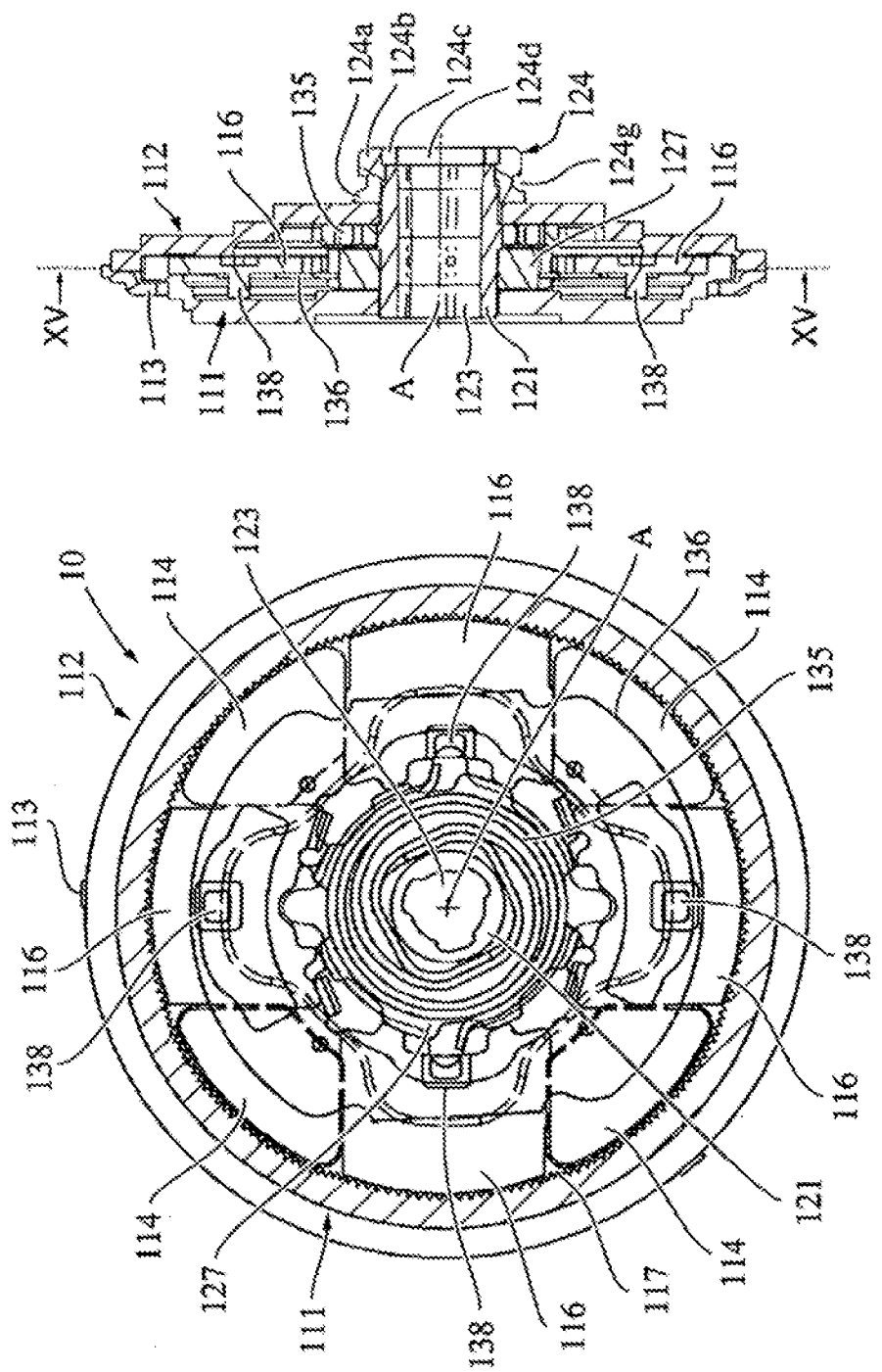
FIG. 35 is a radial section through a fitting and FIG. 36 is an axial section through a fitting along the line XV-XV in FIG. 35.

According to an embodiment variant which is illustrated in FIG. 20 and in which elements which are identical and equivalent are referred to using the same reference numerals as in the embodiment, the actuation unit 71 differs from the one previously described only owing to the form of the general indicator 61. This indicator again has a display arm 61a, an actuation arm 61b and a connection region arranged therebetween. In this instance, the angle between the planar outer face of the display arm 61a and the connection region in this case is smaller than 90°. The actuation arm 61b is further constructed so as to have a curvature which is not concentric relative to the pivot axis of the indicators 51, 52, but instead has a curvature which conforms to the curvature of an end region of the indicators 51, 52, with the end of the actuation arm 61b being drawn substantially outwards and extending practically parallel with the connection region. Unlike the embodiment, entrainment of the general indicator 61 by the indicators 51 and/or 52 as far as the movement end thereof is produced by that configuration of the end region of the actuation arm 61b, and consequently the extension of the general indicator 61 is dependent on the angular position of the indicator 51, 52 which has been pivoted furthest, that is to say, no premature stop is brought about if the curved face of the actuation arm 61b of the general indicator 61 of the previously described embodiment is positioned concentrically relative to the pivot axis of the indicators 51, 52.

A second exemplary embodiment of the present invention is illustrated below with reference to FIGS. 21 to 36:

A vehicle seat 1 for a motor vehicle has a seat member 3' and a backrest 4 which is adjustable in terms of its inclination relative to the seat member 3'. In order to adjust the inclination of the backrest 4, a transmission rod 107 which is arranged horizontally in the transition region between the seat member 3' and the backrest 4 is manually rotated, for example, by means of an operating lever 105. The transmission rod 107 engages in a fitting 10 at both sides of the vehicle seat 1.

The fitting 10 has a first fitting member ill and a second fitting member 112 which can be rotated relative to each other about an axis A. The (notional) axis A is aligned in this instance with the transmission rod 107 and defines the used direction indications of a cylindrical coordinate system. The two fitting members 111 and 112 can be inscribed approximately in a circular disc shape. Both fitting members 111 and 112 preferably comprise metal, in particular steel, which can be hardened at least in regions, in order to take op the axially acting forces, that is to say, to axially retain the fitting members 111 and 112, a surrounding ring 113 is provided. The surrounding ring 113 preferably comprises metal, in particular steel, which is preferably non-hardened. The surrounding ring 113 preferably has a substantially planar annular shape but may in an alternative embodiment be profiled in an L-like manner with a cylindrical portion and, at the end face, with a planar annular portion.

The surrounding ring 113 is securely connected to one of the two fitting members 111 and 112, in this instance in an enter annular portion to the second fitting member 112, for example, by means of laser welding or by means of another fixing technique known per se. The surrounding ring 113 engages over the first, fitting member 111 in the radially outer edge region thereof, optionally with a slip ring being interposed, by means of an inner annular portion which is arranged in a plane perpendicular to the axial direction, without impeding the relative movement of the two fitting members 111 and 112. Furthermore, the mutually facing inner faces of the two fitting members 111 and 112 are protected from the introduction of foreign bodies and contamination and damage.

The surrounding ring 113 and the fitting member 111 or 112 securely connected thereto therefore surround the other of the two fitting members ill and 112, which member is movable relative thereto. From a structural perspective, the two fitting members 111 and 112 therefore together form (with the surrounding ring 113) a disc-like unit.

Once the fitting 10 is assembled, the first fitting member 111 is, for example, securely connected to the structure of the backrest 4, that is to say, fixed to the backrest. The second fitting member 112 is then securely connected to the structure of the seat member 3', that is to say, fixed to the seat member . However, the associations of the fitting members 111 and 112 may also be transposed, that is to say, the first fitting member 111 would, then be fixed to the seat member and the second fitting member 112 would then be fixed to the backrest. The fitting 10 is in the force path between the backrest 4 and seat member 3'.

The fitting 10 is in the form of an engaging member, in which the first fitting member 111 and the second fitting member 112 can be locked together, as described, for example, in DE 10 2006 015 560 B3, whose disclosure content in this regard is expressly incorporated herein by reference.

The second fitting member 112 has-in this instance Four- guiding segments 114 which guide a bar 116 laterally in a radial direction with straight guide faces in pairs, respectively. The- in this instance, a total of four- bars 116 are arranged in a state offset- in this instance through 90° each- relative to each other in a structural space defined between the two fitting members 111 and 112. The bars 116 are provided at the radially outer end thereof with a tooth arrangement which can move into engagement (latch) with a toothed ring 117 of the first fitting member 111 in the form of an internally toothed ring. If the toothed ring 117 and the bars 116 cooperate, the fitting 10 is locked.

The first fitting member 111 is arranged in a recess of the second fitting member 112 and is engaged over thereby in a radially outward manner, whereby the two fitting members 111 and 112 support each other. The radially outer edge region of the first fitting member 111 having the toothed ring 117 is arranged in a radial direction between the guiding segments 114 and the radially outer edge region of the second fitting member 112 (which edge region serves to support the first fitting member 111). In the case of great loads, for example, in the event of a crash, the first fitting member 111 can move into abutment- after deformation- with the toothed ring 117 thereof against the guiding segments 114 which are located nearer in the direction of the load and which have faces which are correspondingly curved (concentrically) in the direction towards the toothed ring 117, This increases the strength of the fitting 10.

The first fitting member 111 can be supported in the second fitting member 112, However, the relationships could be precisely transposed, that is to say, the second fitting member 112 can be supported on the first fitting member 111. In principle, however, both arrangements are equivalent.

At the center of the fitting 10, there is arranged a carrier 121 which comprises, for example, plastics material and which is supported rotatably on at least one of the two fitting members 111 and 112, in this instance the first fitting member 111, to be more precise, in a central opening thereof. At a first vehicle seat side, the transmission rod 107 has at its end a transmission bolt 107a which is aligned with the axis A. The transmission bolt 107a is fitted in a rotationally secure manner on the profiled base member of the transmission rod 107, inserted in that hollow base member or secured on that base member or integrally formed with the base member. The transmission bolt 107a is arranged with a circular-cylindrical portion inside a hole 123- which is profiled per se- of the hollow carrier 121 in a rotatable manner relative thereto. At the other, second vehicle seat side, the carrier 121 is connected in a rotationally secure manner to the transmission rod 107 which is introduced into the central hole 123 of the hollow carrier 121. At one end of the carrier 121, in this instance the end on the second fitting member 112, there is provided a securing ring 124 which comprises plastics material in this instance and which is preferably secured to the carrier 121 by means of ultrasound welding.

An eccentric 127 which is arranged in the structural space defined between the fitting members 111 and 112 is arranged in a rotationally secure manner on the carrier 121. A spring arrangement 135, for example, one or two helical springs fitted one inside the other, is arranged in a central receiving member of one of the two fitting members 111 and 112, in this instance the second fitting member 112, and supported at the outer side in this instance. The spring arrangement 135 acts on the eccentric 127, in this instance in that it is arranged internally on the carrier 121 in a rotationally secure manner. Such a spring arrangement 135 is described, for example, in DE 10 2005 046 807 B3, whose disclosure content in this regard is expressly incorporated herein by reference. The eccentric 127 acted on by the spring arrangement 135 acts on the radially movable bars 116 and urges them so that they are pressed radially outwards in order to latch in the toothed, ring 117, whereby the fitting 10 is locked.

A control disc 136 is arranged in the structural, space axially between the bars 116 and the first fitting member 111 and is located in this instance on the eccentric 127 in a rotationally secure manner. The control disc 136 has- in this instance four- control paths which each cooperate with a projection 138 of each bar 116. The projections 138 project in an axial direction from the bars 116 associated therewith. In the event of rotation (through a few degrees) of the carrier 121- and the eccentric 127 driven therewith and the control disc 136- counter to the force of the spring arrangement 135, the control disc 136 draws the bars 116 radially inwards, that is to say, out of the toothed ring 117, whereby the fitting 10 is unlocked and the two fitting members 111 and 112 can be rotated relative to each other about the axis A. The backrest 4 is now pivotable about the axis A in order to adjust the inclination thereof, that is to say, in order to take up another position for use.

In the case of two-door motor vehicles, access to a rear row of seats is intended to be made easier by the backrest 4 being released by pivoting, for which purpose the unlocked backrest 4 is pivoted out of one of the positions for use thereof forwards into a released position which is not suitable for use as a seat. it increases the operating comfort if the operating lever 105- or another actuation element- does not have to be held during the entire pivoting release action and the fittings nevertheless only lock in the released pivoted position. To that end, an annular pivoting release control element is optionally provided in the fitting 10 between the control disc 136 and the first fitting member 111 around the axis A, as described, for example, in DE 10 2006 015 560 B3, whose disclosure content in this regard is expressly incorporated herein by reference. The two fittings 10, the transmission rod 107 and the operating lever 105 are parts of a fitting system which preferably further includes a backrest compensation spring which is not illustrated and which is arranged on one of the two fittings 10. The transmission rod 107 is arranged between the fitting 10 at the first vehicle seat side and the fitting 10 at the second vehicle seat side.

At both vehicle seat sides, the securing ring 124 of the fitting 10 has a plurality, in this instance four, different functional regions. Directly axially adjacent to the second fitting member 112, the securing ring 124 has an outer profile 124a, in this instance a square which has rounded corners and which is constructed so as to extend round a radially protruding material portion. At the free end remote from the second fitting member 112, the securing ring 124 has a collar 124b which also protrudes radially. An inner profile 124c is constructed radially inside the collar 124b, for example, a peripheral wave shape or a wedge profile. The hollow securing ring 124 is provided radially inwardly with a channel 124d, in which the carrier 121 can be partially introduced. In this instance, the transmission bolt 107a surrounded by the carrier 121 is guided rotatably by the channel 124d at the first vehicle seat side whereas the transmission rod 107 surrounded by the carrier 121 can be introduced at the second vehicle seat side.

The outer profile 124a is provided at the first vehicle seat side in order to cooperate with a first indicator 51 in a rotationally secure manner. The first indicator 51 is a ring having a radially protruding indicator member, the ring having a profile which corresponds to the outer profile 124a and which cooperates preferably in a positive-locking manner. The first indicator 31 indicates the angular position of the carrier 121 at that first vehicle seat side, and therefore of the eccentric 127, which is again a measurement for whether the bars 116 acted on by the eccentric 127 are radially outer or radially inner, that is to say, the fitting 10 is locked or unlocked.

A groove 124g which is, for example, 11 mm deep in relation to the collar 124b is formed on the securing ring 124 axially between the outer profile 124a and the collar 124b. The collar 124b is provided for clip-fit connection with respect to a component to be clip-fitted. Owing to the groove 124g, the collar 124b can be engaged behind in an axial direction in order to provide the clip connection. The component which is intended to be clip-fitted and which has one or more hook-like projections for cooperation with the collar 124b is an adapter 55 in this instance. The annular adapter 55 is preferably formed from plastics material.

The inner profile 124c is provided for rotationally secure connection- or connection for entrainment, where applicable- so as to have a member which acts on the carrier 121, in this instance the said adapter 55. The adapter 55 has a profile which corresponds to the inner profile 124c and which cooperates preferably in a positive-locking manner after a given clearance on a bearing portion. The adapter 55 is thereby supported by means of the bearing portion on the securing ring 124, connected to the carrier 121- with clearance- for entrainment and axially secured to the collar 124b by means of the clip-fit connection.

The adapter 55 is also connected to the transmission bolt 107a for entrainment. To that end, the transmission bolt 107a has a profiled end portion 107e, which is inserted in a central opening 55o of the adapter 55, in a manner adjoining the circular-cylindrical portion. The adapter 55 has an inner profile which corresponds to the profiled end portion 107e and which cooperates preferably in a positive-locking manner after a given clearance on the wall of that central opening 55o. Finally, the adapter 55 is connected to the operating lever 105 in a rotationally secure manner. To that end, the operating lever 105 (preferably of metal) has a profiled receiving: member 105a which receives the adapter 55 in a positive-locking manner. The annular adapter 55 is profiled at the outer side thereof so as to correspond to the receiving member 105a. Alternatively, the operating lever 105 and the adapter 55 are constructed integrally with each other. In the event of misuse, the operating lever 105 has a slotted member 105k in which a pin 13p fixed to the seat member engages, whereby the redirecting angle of the operating lever 105 is limited.

The first indicator 51 is arranged axially between, on the one hand, the second fitting member 112 and, on the other hand, the adapter 55 and the operating lever 105. At the side of the operating lever 105 remote from the first indicator 51 there is arranged a second indicator 52 which is located in a rotationally secure manner on the end portion 107e of the transmission bolt 107a. The second indicator 52 has a radially protruding indicator member from which- in a state parallel with the transmission bolt 107a- a stud protrudes and extends through an aperture 105f in the operating lever 105 and terminates directly adjacent to the first indicator 51. The aperture 105b is selected to be so large in this instance that there is no direct connection of the second indicator 52 to the operating lever 105. Alternatively, the aperture 105f can be configured in such a manner that a connection is brought about in terms of entrainment and exists in an alternative or cumulative manner with respect to the connection between the adapter 55 and the end portion 107e of the transmission bolt 107a.

The angular position of the indicator members of the two indicators Si arid 52 indicates the locking state of the fitting 10, In the initial position, each of the two fittings 10 is in the locked state, that is to say, they are each locked independently of the other. Both indicators 51 and 52 are installed in such a manner that their indicator members are both directed in the same direction. A pin-like general indicator 61 is supported on the seat member 3' in an axially displaceable manner and pretensioned relative thereto by means of at least one indicator spring 63 so that it is covered by a screen in the initial position and so that it is pressed indirectly against the indicator members of the two indicators 51 and 52 (against the stud 57p on the indicator member in the latter case). The two indicators 51 and 52 can control the general indicator 61 with a logical OR function, in order to indicate an unlocked state of at least one of the two fittings 10. The general indicator 61 does not directly adjoin the indicator members of the two indicators 51 and 52 but instead abuts them by means of a coupling spring 65 which is arranged in this regard in series with the general indicator 61.

If the operating lever 105—and therefore the adapter 55 connected thereto in a rotationally secure manner—is redirected out of the initial position, the adapter 55 carries—after travelling through the respective clearance—on the one hand, the securing ring 124 on the carrier 121 at the first vehicle seat side and, on the other hand, the transmission bolt 107a of the transmission rod 107, with the latter being connected to the carrier 121 in a rotationally secure manner at the second vehicle seat side. The fitting 10 is thereby unlocked at both vehicle seat sides so that the backrest 4 can be pivoted. The first indicator 51 is rotated with the rotation of the securing ring 124 (at the first vehicle seat side) and the second indicator 52 is rotated with the rotation of the transmission bolt 107a. The two indicators 51 and 52 act by means of the coupling spring 65 parallel with each other on the general indicator 61 which thereby extends- counter to the pretensioning of the indicator spring 63- and- in the unlocked state of each of the two fittings 10- protrudes beyond the screen so that the general indicator 61 becomes visible. The general indicator 61 is therefore kept in a signal colour, preferably red, at least in the visible area.

If the redirected operating lever 105 is released, the contained spring arrangements 135 in the two fittings 10 attempt to rotate the eccentric 127 back with the carrier 121 in order thereby to act on the bars 116 so that the associated fitting 10 reaches the locked state. At the first vehicle seat side, the carrier 121 rotates back its securing ring 124 and therefore the first indicator 51 whereas, at the second vehicle seat side, the carrier 121 rotates the transmission rod 107 together with the transmission bolt 107*a* and therefore the second indicator 52, Furthermore, the said securing ring 124 or the transmission bolt 107*a* or both rotate(s) the adapter 55 after the respective clearance, whereby the redirected operating lever 105 moves back into the initial position. If both indicators 51 and 52 rotate back, that is to say, indicate the locked state of the respective fitting 10, the general indicator 61 also travels inwards (owing to the pre tensioning of the indicator spring 63 acting thereon). If, however, only one of the two fittings 10 (or even none of them) can lock, for example, because the bars 116 and the toothed ring 117 are by chance located "tooth on tooth", only the indicator 51 or 52 that is associated with the fitting 10 which has arrived in the locked state rotates back. The other indicator 52 or 51 which is associated with the fitting 10 still in the unlocked state remains in the rotated state so that the general indicator 61 remains extended. The user thereby recognizes that the initial position has not yet been reached, that is to say, at least one of the two fittings 10 is not yet in the locked state and actions are still necessary for correct locking, A "tooth on tooth" position can be resolved by a minimal pivot movement of the backrest 4 (approximately 1°).

LIST OF REFERENCE NUMERALS

1 Vehicle seat
3 Seat cushion
3' Seat member
3*a* Seat cushion carrier
3*b* Arm
3*p* Pin fixed to seat member
4 Backrest
10 Fitting
9 Base
9*a* First seat rail
9*b* Second seat rail
11 First foot
13 Crank
21 Rear foot
23 Lock, locking system
26 Rear foot four-bar linkage
27 First rod
29 Second rod
33 Backrest pivot axis
35 Linkage
36 Cushion four-bar linkage
41 Handle
41*a* Holder
41*b* Actuation lever
41*b'* Gripping region
41*b"* Actuation arm
41*c* Indicator opening
43 Bowden cable
45 Bowden cable holder
45*a* Sheath support
45*b* Axle
45*c* Core end holder
45*c'* Cam
45*c"* Contact region
45*d* Guide face
51 First indicator
52 Second indicator
55 Adapter
55*o* Central opening
57*p* Stud
61 General indicator
61*a* Display arm
61*b* Actuation arm
63 Indicator spring
65 Coupling spring
71 Actuation unit
105 Operating lever
105*a* Receiving member
105*f* Aperture
105*k* Slotted member
107 Transmission rod
107*a* Transmission bolt
107*e* End portion
111 First fitting member
112 Second fitting member
113 Surrounding ring
114 Guiding segment
116 Bar
117 Toothed ring
121 Carrier
123 Hole
124 Securing ring
124*a* Outer profile
124*b* Collar
124*c* Inner profile
124*d* Channel
124*g* Groove
127 Eccentric
135 Spring arrangement
136 Control disc
138 Projection
A Axis

The invention claimed is:

1. An actuation unit for a vehicle seat, having a handle for the common actuation of two locking systems, a force transmission between the handle and each locking system, a first indicator which is associated with a first force transmission, a second indicator which is associated with a second force transmission, wherein the two indicators each indicate the locking state of the associated locking system, and the two indicators control a general indicator whereby either the first, second or both indicators control the general indicator in order to display the unlocked state in a visible manner.

2. The actuation unit as claimed in claim 1, wherein the force transmission is formed by Bowden cables between the handle and the locking system at least in a partial region.

3. The actuation unit as claimed in claim 2, wherein the indicators are rotatable relative to an axis and are connected to cores of the Bowden cables.

4. The actuation unit as claimed in claim 1, wherein the two indicators or portions thereof are arranged spatially beside each other and both act on the general indicator.

5. The actuation unit as claimed in claim 1, wherein a force can be applied to the indicators from a first direction by the handle and an opposing force can be applied by the force transmission from a second direction different from the first direction.

6. The actuation unit as claimed in claim 5, wherein the general indicator cooperates with the indicators in a region in which the force transmission acts on the indicators.

7. The actuation unit as claimed in claim 1, wherein the indicators carry out a pivot movement and the general indicator carries out a linear movement.

8. The actuation unit as claimed in claim 1, wherein the indicators can be pivoted about the same pivot axis as an actuation lever of the handle.

9. The actuation unit as claimed in claim 8, wherein the handle has a single actuation arm which cooperates with the indicators.

10. A vehicle seat which has a seat member and a backrest and which can be moved into a flat floor position and/or entry position, comprising an actuation unit as claimed in claim 1.

* * * * *